(12) United States Patent
Hopkins et al.

(10) Patent No.: US 12,151,978 B2
(45) Date of Patent: Nov. 26, 2024

(54) DENSITY ENHANCEMENT METHODS AND COMPOSITIONS

(71) Applicants: The Trustees of Princeton University, Princeton, NJ (US); Heavy Metal LLC, Fremont, CA (US)

(72) Inventors: Adam Bayne Hopkins, San Jose, CA (US); Salvatore Torquato, Princeton, NJ (US)

(73) Assignees: The Trustees of Princeton University, Princeton, NJ (US); Heavy Metal LLC, Fremont, CA (US)

( * ) Notice: Subject to any disclaimer, the term of this patent is extended or adjusted under 35 U.S.C. 154(b) by 138 days.

(21) Appl. No.: 17/846,300

(22) Filed: Jun. 22, 2022

(65) Prior Publication Data

US 2022/0395898 A1    Dec. 15, 2022

Related U.S. Application Data

(63) Continuation of application No. 15/071,004, filed on Mar. 15, 2016, now Pat. No. 11,396,044, which is a
(Continued)

(51) Int. Cl.
*C04B 35/111* (2006.01)
*B22F 1/052* (2022.01)
(Continued)

(52) U.S. Cl.
CPC .......... *C04B 35/111* (2013.01); *B22F 1/052* (2022.01); *B22F 1/065* (2022.01); *B22F 3/11* (2013.01);
(Continued)

(58) Field of Classification Search
None
See application file for complete search history.

(56) References Cited

U.S. PATENT DOCUMENTS 3,950,166 A     4/1976  Obara et al.
4,073,999 A  *  2/1978  Bryan ................... C04B 38/02
                                                    606/76

(Continued)

FOREIGN PATENT DOCUMENTS

DE    102011053740 A1    3/2013
EP       0776713 A2       6/1997
(Continued)

OTHER PUBLICATIONS

Non-Final Office Action for U.S. Appl. No. 16/235,654, mailed on Apr. 30, 2020, 7 pages.
(Continued)

*Primary Examiner* — Seth Dumbris
(74) *Attorney, Agent, or Firm* — Cooley LLP

(57) ABSTRACT

The present invention relates to granular composite density enhancement, and related methods and compositions. The applications where these properties are valuable include but are not limited to: 1) additive manufacturing ("3D printing") involving metallic, ceramic, cermet, polymer, plastic, or other dry or solvent-suspended powders or gels, 2) concrete materials, 3) solid propellant materials, 4) cermet materials, 5) granular armors, 6) glass-metal and glass-plastic mixtures, and 7) ceramics comprising (or manufactured using) granular composites.

12 Claims, 12 Drawing Sheets

Related U.S. Application Data continuation of application No. 14/912,661, filed as application No. PCT/US2014/051468 on Aug. 18, 2014, now Pat. No. 10,207,327.

(60) Provisional application No. 62/014,922, filed on Jun. 20, 2014, provisional application No. 61/933,007, filed on Jan. 29, 2014, provisional application No. 61/867,788, filed on Aug. 20, 2013.

(51) Int. Cl.

| | | |
|---|---|---|
| *B22F 1/065* | (2022.01) | |
| *B22F 3/11* | (2006.01) | |
| *B22F 7/00* | (2006.01) | |
| *B22F 7/02* | (2006.01) | |
| *B23K 26/342* | (2014.01) | |
| *B23K 26/354* | (2014.01) | |
| *B28B 1/00* | (2006.01) | |
| *B29C 45/00* | (2006.01) | |
| *B29C 64/153* | (2017.01) | |
| *B29C 64/165* | (2017.01) | |
| *B29C 64/371* | (2017.01) | |
| *B33Y 10/00* | (2015.01) | |
| *B33Y 70/00* | (2020.01) | |
| *B33Y 70/10* | (2020.01) | |
| *C03C 3/04* | (2006.01) | |
| *C03C 12/00* | (2006.01) | |
| *C04B 20/00* | (2006.01) | |
| *C04B 28/02* | (2006.01) | |
| *C04B 35/547* | (2006.01) | |
| *C04B 35/56* | (2006.01) | |
| *C04B 35/626* | (2006.01) | |
| *C22C 14/00* | (2006.01) | |
| *C22C 32/00* | (2006.01) | |
| *C22C 38/00* | (2006.01) | |
| *C22C 38/02* | (2006.01) | |
| *C22C 38/44* | (2006.01) | |
| *C22C 38/56* | (2006.01) | |
| *B22F 10/28* | (2021.01) | |
| *B22F 10/34* | (2021.01) | |
| *B29C 64/268* | (2017.01) | |
| *B29K 105/00* | (2006.01) | |
| *B33Y 30/00* | (2015.01) | |
| *B33Y 40/00* | (2020.01) | |
| *C22C 1/04* | (2023.01) | |
| *C22C 1/08* | (2006.01) | |
| *C22C 29/08* | (2006.01) | |

(52) U.S. Cl.
CPC ............. *B22F 7/002* (2013.01); *B22F 7/008* (2013.01); *B22F 7/02* (2013.01); *B23K 26/342* (2015.10); *B23K 26/354* (2015.10); *B28B 1/001* (2013.01); *B29C 45/0001* (2013.01); *B29C 64/153* (2017.08); *B29C 64/165* (2017.08); *B29C 64/371* (2017.08); *B33Y 10/00* (2014.12); *B33Y 70/00* (2014.12); *B33Y 70/10* (2020.01); *C03C 3/04* (2013.01); *C03C 12/00* (2013.01); *C04B 20/0096* (2013.01); *C04B 28/02* (2013.01); *C04B 35/547* (2013.01); *C04B 35/56* (2013.01); *C04B 35/5626* (2013.01); *C04B 35/62695* (2013.01); *C22C 14/00* (2013.01); *C22C 32/0052* (2013.01); *C22C 38/002* (2013.01); *C22C 38/02* (2013.01); *C22C 38/44* (2013.01); *C22C 38/56* (2013.01); *B22F 10/28* (2021.01); *B22F 10/34* (2021.01); *B22F 2301/15* (2013.01); *B22F 2301/205* (2013.01); *B22F 2301/35* (2013.01); *B22F 2302/10* (2013.01); *B22F 2998/10* (2013.01); *B22F 2999/00* (2013.01); *B29C 64/268* (2017.08); *B29K 2105/0064* (2013.01); *B29K 2105/251* (2013.01); *B33Y 30/00* (2014.12); *B33Y 40/00* (2014.12); *C04B 2235/3217* (2013.01); *C04B 2235/3847* (2013.01); *C04B 2235/405* (2013.01); *C04B 2235/446* (2013.01); *C04B 2235/528* (2013.01); *C04B 2235/5427* (2013.01); *C04B 2235/5436* (2013.01); *C04B 2235/5445* (2013.01); *C04B 2235/5472* (2013.01); *C04B 2235/608* (2013.01); *C22C 1/0458* (2013.01); *C22C 1/08* (2013.01); *C22C 29/08* (2013.01); *Y02P 10/25* (2015.11)

(56) References Cited

U.S. PATENT DOCUMENTS

| | | |
|---|---|---|
| 5,431,967 A | 7/1995 | Manthiram et al. |
| 5,817,206 A | 10/1998 | McAlea et al. |
| 5,990,268 A | 11/1999 | Dickens, Jr. et al. |
| 6,171,690 B1 | 1/2001 | Kenny |
| 7,666,247 B2 | 2/2010 | He et al. |
| 8,329,501 B1 | 12/2012 | Robinson et al. |
| 10,207,327 B2 | 2/2019 | Hopkins et al. |
| 10,864,577 B2 | 12/2020 | Hopkins et al. |
| 11,396,044 B2 | 7/2022 | Hopkins et al. |
| 2001/0001640 A1 | 5/2001 | Miller et al. |
| 2002/0107140 A1 | 8/2002 | Hampden-Smith et al. |
| 2004/0009089 A1 | 1/2004 | Liu et al. |
| 2004/0191106 A1 | 9/2004 | O'Neill et al. |
| 2006/0147332 A1 | 7/2006 | Jones et al. |
| 2006/0198753 A1 | 9/2006 | Hong et al. |
| 2007/0128066 A1 | 6/2007 | Chun et al. |
| 2008/0084010 A1 | 4/2008 | Naruse et al. |
| 2009/0307987 A1 | 12/2009 | Davies et al. |
| 2010/0089293 A1 | 4/2010 | Guynn et al. |
| 2010/0267222 A1* | 10/2010 | Robinson ............ C23C 18/1204 438/502 |
| 2010/0307067 A1 | 12/2010 | Sigalas et al. |
| 2011/0285060 A1 | 11/2011 | Yamamoto et al. |
| 2013/0090230 A1* | 4/2013 | Champion .......... C04B 35/6281 501/127 |
| 2015/0321255 A1 | 11/2015 | Colin et al. |
| 2016/0104876 A1 | 4/2016 | Avison et al. |
| 2016/0193696 A1 | 7/2016 | McFarland et al. |
| 2016/0200045 A1 | 7/2016 | Hopkins et al. |
| 2016/0368057 A1 | 12/2016 | Hopkins et al. |
| 2019/0308244 A1 | 10/2019 | Hopkins et al. |

FOREIGN PATENT DOCUMENTS

| | | |
|---|---|---|
| EP | 1442811 A1 | 8/2004 |
| EP | 2925470 A1 | 10/2015 |
| EP | 3024610 B1 | 11/2018 |
| JP | S60194001 A | 10/1985 |
| JP | H02166201 A | 6/1990 |
| JP | H10221296 A | 8/1998 |
| JP | 2000336403 A | 12/2000 |
| JP | 2003306705 A | 10/2003 |
| JP | 2005023416 A | 1/2005 |
| JP | 2005533177 A | 11/2005 |
| JP | 2006041501 A | 2/2006 |
| JP | 2011241450 A | 12/2011 |
| JP | 5573110 B2 | 8/2014 |
| JP | 2016535169 A | 11/2016 |
| JP | 2016536350 A | 11/2016 |
| WO | WO-9606881 A2 | 3/1996 |
| WO | WO-2004007124 A1 | 1/2004 |
| WO | WO-2014083277 A1 | 6/2014 |
| WO | WO-2015014711 A1 | 2/2015 |
| WO | WO-2015025171 A2 | 2/2015 |

(56) References Cited

FOREIGN PATENT DOCUMENTS

| WO | WO-2015032590 A2 | 3/2015 |
|---|---|---|
| WO | WO-2015073081 A1 | 5/2015 |
| WO | WO-2015108544 A1 | 7/2015 |

OTHER PUBLICATIONS

Notice of Allowance for U.S. Appl. No. 15/071,004, mailed Mar. 23, 2022, 7 pages.

Notice of Allowance for U.S. Appl. No. 16/235,654, mailed Aug. 13, 2020, 10 pages.

Office Action for Japanese Application No. JP20210092969 dated Dec. 27, 2022, 5 pages with English translation.

Office Action for Japanese Patent Application No. 2016-536350, dated Jun. 25, 2019, 9 pages with English translation.

Restriction Requirement for U.S. Appl. No. 16/235,654, mailed on Dec. 13, 2019, 6 pages.

Japanese Pre-Trial Report for Japanese Patent Application No. JP20210092969, dated May 22, 2023, 3 pages with English translation.

Office Action for European Application No. EP14861670.9 dated Oct. 2, 2023, 8 pages.

Advisory Action for U.S. Appl. No. 14/912,661, mailed Feb. 28, 2018.

Australian Examination Report for Australian Application No. AU2014349205, dated Jun. 13, 2018, 4 pages.

Australian Examination Report for Australian Application No. AU2014349205, dated Jun. 23, 2017, 5 pages.

Australian Office Action for Australian Patent Application No. 2018204556, dated May 23, 2019, 4 pages.

Bai, Y. et al. (2015) "Effect of Bimodal Powder Mixture on Powder Packing Density and Sintered Density in Binder Jetting of Metals" 2015 Annual International Solid Freeform Fabrication Symposium, vol. 62, pp. 758-771.

Brazilian Examination Report for Brazilian Patent Application No. 112016003414, dated Dec. 27, 2019, 8 pages with Machine translation.

Brazilian Office Action for Brazilian Patent Application No. 112016003414, dated Aug. 5, 2021, 13 pages with Machine translation.

Brazilian Office Action for Brazilian Patent Application No. 112016003414, dated Feb. 14, 2022, 8 pages with Machine translation.

Canadian Examination Report for Canadian Patent Application No. 2920344, dated Jun. 29, 2021, 4 pages.

Canadian Examination Report for Canadian Patent Application No. 2920344, dated Nov. 9, 2020, 6 pages.

Notice of Allowance for U.S. Appl. No. 14/912,661, mailed Oct. 1, 2018.

De Larrard, F. "Concrete optimisation with regard to packing density and rheology". In 3rd RILEM International Symposium on Rheology of Cement Suspensions such as Fresh concrete (Aug. 19, 2009), 11 pages.

Donev, A. et al. "Unexpected density fluctuations in jammed disordered sphere packings". Physical Review Letters (Aug. 26, 2005); 95(9): 090604.

European Office Action for European Patent Application No. EP 14861670, dated May 21, 2021, 2 pages.

European Office Action for European Patent Application No. EP 16179428, dated May 10, 2022, 5 pages.

European Search Report issued in European Patent Application No. EP 16179428, dated Dec. 15, 2016.

Extended European Search Report issued in European Patent Application No. EP 14861670, dated Dec. 15, 2016, 10 pages.

Final Office Action for U.S. Appl. No. 14/912,661, mailed Dec. 26, 2017.

Final Office Action for U.S. Appl. No. 15/071,004, mailed on Aug. 7, 2019, 11 pages.

Final Office Action for U.S. Appl. No. 15/071,004, mailed on Oct. 28, 2021, 11 pages.

Final Office Action for U.S. Appl. No. 15/071,004, mailed on Sep. 4, 2020, 11 pages.

Furnas, C.D. (1928) "The relations between specific volume, voids, and size composition in systems of broken solids of mixed sizes" U.S. Bureau of Mines: Report of Investigations, 2894, pp. 5-6.

Henderson, C.B. and R.S. Scheffee (1983) "The Optimal Particle-Size Distribution of Coal for Coal-Water Slurries" ACS Division of Fuel Chemistry, Preprints 28.

Hopkins, A.B. et al. "Disordered strictly jammed binary sphere packings attain an anomalously large range of densities". Physical Review E. (Aug. 30, 2013); 88(2): 022205.

Indian Office Action for Indian Patent Application No. 201647007589, dated Oct. 27, 2020, 7 pages, with English translation.

International Preliminary Report for Patentability for International Application No. PCT/US2014/051468, mailed Aug. 12, 2015, 30 pages.

International Search Report and Written Opinion for International Application No. PCT/US2014/051468, mailed Apr. 13, 2015, 11 pages.

Japanese Office Action for Application No. JP20210092969 dated Jun. 7, 2022, 7 pages.

Japanese Office Action for Japanese Patent Application No. 2016-536350, dated Aug. 21, 2018, 14 pages with English translation.

Japanese Pre-Trial Report for Japanese Patent Application No. 2016-536350, dated Jan. 30, 2020, 9 pages with English translation.

Japanese Search Report for Japanese Patent Application No. 2021-092969, dated Jun. 8, 2022, 49 pages, with English translation.

Kolonko, M. et al. "A hierarchical approach to simulate the packing density of particle mixtures on a computer". Granular Matter (Dec. 2010); 12(6): 629-643.

Korean Office Action for Korean Patent Application No. 10-2016-7006973, dated Apr. 27, 2020, 9 pages, with English translation.

Mangulkar, M.N. et al. "Review of particle packing theories used for concrete mix proportioning". Contributory Papers (May 9, 2013); 141-148.

Martin, C.L. et al. "Isostatic compaction of bimodal powder mixtures and composites". International Journal of Mechanical Sciences (Jun. 1, 2004); 46(6): 907-927.

McGeary (1961) Mechanical Packaging of Spherical Particles. Journal of the American Ceramic Society. vol. 44, No. 10, pp. 513-522.

Mexican Office Action for Application No. MX/a/2020/006880 dated Feb. 10, 2022, 6 pages, with English translation.

Murr, L.E. et al. (2009) "Microstructure and mechanical properties of Ti-6A1-4 V for biomedical and related applications involving rapid-layer powder manufacturing" in R.J. Narajan (Eds.) Wiley-American Ceramic Society: Advances in Biomedical and Biomimetic Materials. Ceramic Transactions, vol. 206. pp. 71-82.

Non-Final Office Action for U.S. Appl. No. 14/912,661, mailed Jun. 27, 2018.

Non-Final Office Action for U.S. Appl. No. 14/912,661, mailed on Jun. 14, 2017, 15 pages.

Non-Final Office Action for U.S. Appl. No. 15/071,004, mailed on Jan. 28, 2019, 10 pages.

Non-Final Office Action for U.S. Appl. No. 15/071,004, mailed on Mar. 27, 2020, 11 pages.

Non-Final Office Action for U.S. Appl. No. 15/071,004, mailed on May 13, 2021, 12 pages.

Notification of Refusal issued in Korean Patent Application No. 10-2016-7006973 dated Nov. 22, 2019, 18 pages with English translation.

Olakanmi, E.O. et al. "Laser sintering of blended Al—Si powders". Rapid Prototyping Journal (Mar. 2, 2012); 18(2): 109-119.

Restriction Requirement for U.S. Appl. No. 14/912,661, mailed Apr. 28, 2017.

Restriction Requirement for U.S. Appl. No. 15/071,004, mailed on Aug. 10, 2018, 8 pages.

Scott, G.D. (1960) "Packing of Spheres: Packing of Equal Spheres" Nature, 188:908-909.

Shilstone, J.M. "Performance-based concrete mixtures and specifications for today". Concrete International (Feb. 2002); 24(2): 80-83.

(56) References Cited

OTHER PUBLICATIONS

Shilstone, J.S.M. "Concrete mixture optimization". Concrete International (Jun. 1, 1990); 12(6): 33-39.
Xu, R. et al. (Jun. 24, 2003) "Comparison of sizing small particles using different technologies" Powder Technology, 132(2-3):145-153.
Yu, A.B. et al. "Modifying the linear packing model for predicting the porosity of nonspherical particle mixtures". Industrial & Engineering Chemistry Research (Oct. 8, 1996); 35(10): 3730-3741.
Zachary, C.E. et al. "Hyperuniform long-range correlations are a signature of disordered jammed hard-particle packings". Physical Review Letters (Apr. 29, 2011); 106(17): 178001.
Zhang, J. et al. (Mar. 15, 1999) "Optimal Packing of Polydisperse Hard-Sphere Fluids" J Chem Phys, 110(11):5318-5324.
European Office Action for European Patent Application No. EP 16179428, dated Nov. 15, 2022, 7 pages.
European Intention to Grant for Application No. EP 16179428, dated May 28, 2024, 115 pages.
Office Action for Japanese Patent Application No. JP20210092969 dated Feb. 13, 2024, 14 pages.
Office Action for Canadian Application No. CA3172723 dated Oct. 31, 2023, 6 pages.
European Office Action for European Patent Application No. EP 16179428, dated May 25, 2023, 6 pages.
European Application No. EP14861670.9: Office Action dated Jul. 29, 2024; 5 pages.
Indian Examination Report for Indian Patent Application No. 202248076431, dated Oct. 1, 2024; 6 pages, including English translation.
Japanese Trial Decision for Japanese Patent Application No. 2021-092969, dated Oct. 1, 2024; with partial English translation, 3 pages.

\* cited by examiner

DENSITY ENHANCEMENT METHODS AND COMPOSITIONS

FIELD OF THE INVENTION

This invention was made with government support under grant numbers DMR-0820341 and DMS-1211087 awarded by the National Science Foundation. The government has certain rights in the invention.

BACKGROUND

A granular material, or granular composite, is an accumulation of constituent particles, where each constituent has a pre-determined geometry (size and shape) that remains approximately fixed when the constituents are placed in close proximity and pressed against one another, for example, by gravity. In a granular composite, the constituents may also be suspended in a solvent or liquid or held approximately or exactly fixed in place by a "paste" or "glue". Granular composites are ubiquitous throughout industry, research labs, and the natural world. Common examples of granular composites in the natural world include dirt, sand, and gravel; common examples of man-made granular composites include concrete, bird shot, sugar, baby powder, solid propellants, cermets, ceramics, inks, and colloids.

The physical characteristics of a granular composite depend intimately on the detailed multi-bodied structure that is formed through the physical interaction of its constituent particles, and on the physical characteristics of the materials that comprise the constituents. These characteristics include but are not limited to: porosity (fraction of void space not filled by constituent particles), viscosity, mechanical strength, ductility, tensile strength, elastic modulus, bulk modulus, shear modulus, thermal conductivity, electrical conductivity, and thermal expansion coefficient. For example, a composite consisting of a given type of material with a higher-porosity structure will generally be less strong, thermally conductive, and electrically conductive than a composite consisting of the same type of material but with a lower-porosity structure. Or, a composite consisting of constituents that tend to be very rough (high coefficients of friction) and aspherical in shape will, when randomly mixed, generally form a less-dense (higher porosity) structure than a composite consisting of constituents of the same material but where the constituents are relatively less rough and apsherical.

The study of granular composites and their applications has generally focused on measuring both the physical characteristics of a given composite and the geometric size, shape, and other physical characteristics of its constituent particles. For example, in the concrete industry, where crushed rock and sand are mixed with wet cement (the "paste") in certain proportions to form concrete, a "passing curve" is often used to approximately represent the size distribution of constituent particles in the mixture. This "passing curve" is generated by passing the dry mixture of sand and crushed rock (also called the aggregate) through a succession of finer and finer sieves, then plotting the volume (or mass) fraction of aggregate that has passed through each sieve. It is known that changing the size distribution of particles, for example, by reducing the amount of smaller-sized aggregate (the sand, in this case), can change the physical characteristics of the wet concrete, for example, wet concrete viscosity, and also of the dried and set concrete, for example, concrete elastic moduli and durability. In this way, some researchers have sought to improve concrete properties by changing the mixing ratios of aggregates. F. de Larrard, *Concrete optimization with regard to packing density and rheology*, 3rd RILEM international symposium on rheology of cement suspensions such as fresh concrete, France (2009). J. M. Shilstone, Jr., and J. M. Schilstone, Sr., *Performance based concrete mixtures and specifications for today*, Concrete International, 80-83, February (2002). F. de Larrard, *Concrete mixture proportioning*, Routledge, New York (1999). J. M. Schilstone, *Concrete mixture optimization*, Concrete International, 33-40, June (1990).

However, the broad problem of designing granular composites based on constituent geometry and characteristics has not been generally tractable due to its immense complexity. The characteristics of a composite depend not only on the detailed geometry and physical characteristics of each and every component constituent, but also upon the position, orientation, and arrangement of every particle in the composite. For example, a composite structure that is obtained by shaking constituents in a closed container and then pouring into another container will have a different porosity than a structure generated from the exact same constituents by vibrating at high frequency in a container. This difference can be quite large, for example, as much as 50% less porosity for the vibrated preparation, and the inherent differences between the different porosity structures will have a pronounced effect on the physical characteristics of the composite.

For example, in concrete, the mechanical strength of a concrete has been shown to depend exponentially on the porosity of the aggregate mixture, with mixtures exhibiting less porosity being exponentially stronger. However, the viscosity, inversely related to ease of flow, also depends exponentially on the porosity, with mixtures exhibiting less porosity flowing less well (having higher viscosity). A concrete must flow to some extent in order to be poured at a job site, and as such more porosity in the aggregate mixture might be required, even though more porosity means lower strength. Another example is granular armors, where lower porosity of the armor before molding would mean higher viscosity, making the finished armor more difficult to fabricate but also stronger. With respect to solid propellants, the thrust of a rocket depends roughly on the square of the density (density in composites is proportional to one minus porosity) of the composite propellant.

In general, what is needed is the ability to effectively predict, design and control the structures of granular composites to provide a large degree of control over composite physical characteristics. In particular, what is needed is a way to reduce the porosity of composites in order to improve physical characteristics, and, in many cases, to reduce porosity while maintaining low enough viscosity to retain the ability to be used in fabrication processes.

SUMMARY OF THE INVENTION

The present invention relates to granular composite density enhancement, and related methods and compositions. The applications where these properties are valuable include but are not limited to: 1) additive manufacturing ("3D printing") involving metallic, ceramic, cermet, polymer, plastic, or other dry or solvent-suspended powders or gels, 2) concrete materials, 3) solid propellant materials, 4) cermet materials, 5) granular armors, 6) glass-metal and glass-plastic mixtures, and 7) ceramics comprising (or manufactured using) granular composites.

In one embodiment, the present invention contemplates a method of formulating so as to produce materials of low porosity. In one embodiment, the present invention contemplates a method of making a granular composite composition, comprising: a) providing at least first and second separate groups of at least 100 particles, each group possessing an average particle size $V_i^{avg}$ and a passing curve, representative of the particle volume probability density function $P_i(V)$ of the group, that exhibits one or more local maxima; and b) mixing particles from said two or more groups under conditions such that some combination of at least 50 particles from each group yields a combined granular composite exhibiting a combined passing curve, representative of the particle volume probability density function $P(V)$ of the combination, wherein said combined granular composite has the following features: i) at least two local maxima, the maximum occurring at the smaller volume (point) labeled $V_1$ and the maximum occurring at the larger volume labeled $V_2$, associated with different particle groups "1" and "2" such that the ratio of $V_2^{avg}/V_1^{avg}$ is less than or equal to 10,000, ii) at least one local minimum falling between the aforementioned two maxima such that the height of the passing curve at the local minimum is no more than 75% of the height of the passing curve at either maxima, and iii) positive points $V_l$ and $V_r$, with at least one of the aforementioned local minimum falling between them and $V_r/V_l=10,000$, such that the integral of $V*P(V)$ from $V_l$ to at least one of the local minima falling between the aforementioned two maxima and meeting criterion ii) is at least 2% of the integral of $V*P(V)$ from $V_l$ to $V_r$, and such that the integral from that same local minimum to $V_r$ is at least 2% of the integral of $V*P(V)$ from $V_l$ to $V_r$. In one embodiment, $V_2^{avg}/V_1^{avg} \leq 2,000$ and $\geq 25$.

In one embodiment, there are more than two particle groups and the method comprises, prior to step b), dividing particle groups into subsets. In one embodiment, said mixing is done under conditions which inhibit phase separation. In one embodiment, said combined composite exhibits a porosity of less than 25%, or less than 20%, or even less than 15%. In one embodiment, said mixing reduces (relative) viscosity. In one embodiment, the combined composite is immersed in a solvent, paste, gel, liquid, or suspension. In one embodiment, $V_2^{avg}/V_1^{avg}$ is less than or equal to (<=) 2,000 and greater than or equal to (>=) 25. In one embodiment, the method further comprises optimization procedures to calculate a low-porosity combination using two or more of said particle groups, wherein the optimization includes obtaining porosity functions $P_i(\varphi_{i,j1}, \varphi_{i,j2} \ldots \varphi_{i,jN})$ or partial subset porosity functions $P_{j1,j2}, \ldots (\varphi_{i,j1}, \varphi_{i,j2} \ldots )$ for mixtures of particles groups. In one embodiment, optimization procedures incorporate constraints on physical characteristics of the combined composite. In one embodiment, said mixing results in a hyperuniform structure. In one embodiment, said mixing results in a nearly-hyperuniform structure. In one embodiment, said mixing is done in a container with a diameter and height at least 100 times that of the largest particles in the largest group. In one embodiment, said mixing comprises adding particles from the second group into the first group of particles. In one embodiment, said mixing results in a final percentage of particles from the group with smaller average particle volume of approximately 10-80%. In one embodiment, said mixing comprises adding particles from the first group into the second group of particles. In one embodiment, the particle size distribution for said first and second groups exhibit arithmetic standard deviations of less than 20%. In one embodiment, the method further comprises c) using said granular composite with a final porosity of less than 25% as a powder, e.g. as a powder in laser sintering, or as a powder in laser melting, or as a powder in additive manufacturing of ceramics, or as a powder in powder metallurgy, or as a powder for injection molding, or as a powder for production of granular armors, or as a powder for some other purpose. In yet another embodiment, the method further comprises c) using the granular composite in making concrete.

The present invention also contemplates compositions generated by methods described herein. In one embodiment, the present invention contemplates a granular composite composition composed of at least 100 particles, that exhibits a passing curve, representative of the particle size (volume) probability density function $P(V)$, that has the following features; i) at least two local maxima occurring at volumes $V_i$ and $V_j$, wherein the smaller of the volumes is labeled $V_i$ and the larger of the volumes is labeled $V_j$; ii) at least one local minimum occurring at $V_{i-j}$, such that $V_i<V_{i-j}<V_j$, wherein the height of the passing curve at the local minimum occurring at $V_{i-j}$ is no more than 75% percent of the height of the passing curve at either local maximum; iii) points $V_{h-i}$ and $V_{j-k}$, such that $V_{h-i}<V_i<V_j<V_{j-k}$, wherein the point $V_{h-i}$ is defined as: whichever is larger of the volume of the smallest particle in the composite or a minimum between maxima at $V_h$ and $V_i$, $V_h<V_i$, such that the maxima at VA corresponds to a particle group "h" meeting all criteria i), ii), iii), iv) and v), and wherein the point $V_{j-k}$ is defined as: whichever is smaller of either the volume of the largest particle in the composite or a minimum between maxima at $V_j$ and $V_k$, $V_j<V_k$, such that the maxima at $V_k$ corresponds to a particle group "k" meeting all criteria i), ii), iii), iv) and v); iv) average particle volumes $V_i^{avg}$ and $V_j^{avg}$ such that $V_j^{avg}/V_i^{avg} \leq 10,000$, of corresponding particle groups "i" and "j", where group "i" is defined as the group containing all particles with volumes ranging from $V_{h-i}$ to $V_{i-j}$, and group "j" is defined as the group containing all particles with volumes ranging from $V_{i-j}$ to $V_{j-k}$, and; v) points $V_l$ and $V_r$, $V_l<V_i^{avg}<V_j^{avg}<V_r$ and $V_r/V_l=10,000$, such that the integral of $V*P(V)$ from $V_{h-i}$ to at least one of the local minima $V_{i-j}$ falling between the maxima at $V_i$ and $V_j$ and meeting criterion ii) is at least 2% of the integral of $V*P(V)$ from $V_l$ to $V_r$, and such that the integral from that same local minimum at $V_{i-j}$ to $V_{j-k}$ is at least 2% of the integral of $V*P(V)$ from $V_l$ to $V_r$. In one embodiment, for at least one pair of particle groups "j" and "i", $V_j^{avg}>V_i^{avg}$, $V_j^{avg}/V_i^{avg}<=2,000$ and $>=25$. In one embodiment, for at least one pair of adjacent (by average volume) particle groups, the average number of large-large nearest neighbors within the larger (by average volume) of the two groups is greater than or equal to one. In one embodiment, the relative volume of the smaller of at least one pair of adjacent (by average volume) particle groups is between 10% and 80% of the total volume of particles in the pair of groups. In one embodiment, the mixture of particle groups in fixed amounts occupies a larger volume of space than the volume of space occupied by any single particle group in that fixed amount on its own. In one embodiment, said composite exhibits a porosity of less than 25%, and more preferably less than 20%, and even less than 15%. In one embodiment, said granular composite is immersed in a solvent, paste, gel, liquid, or suspension. In one embodiment, the spatial phase separation of particles into similarly-sized groups does not occur for all groups of particles. In one embodiment, the pair correlation function of said granular composite demonstrates an increased probability of linear arrangements of the centers of three contacting particles, where two particles exhibit volumes at least 25 times that of the other particle or where two particles exhibit volumes at least 25 times smaller than that of the other particle.

In one embodiment, the present invention contemplates systems, layers and methods for additive manufacturing. In one embodiment, the present invention contemplates a system comprising a) a dispenser positioned over a target surface, said dispenser containing a granular composite having a porosity of 20% or less; and b) an energy source positioned to transfer energy to said composite when composite is dispensed on said target surface. In one embodiment, said composite is protected against oxidation with an inert shielding gas. In one embodiment, said composite is a sinterable powder. In one embodiment, said composite is a fusible powder. In one embodiment, said composite is a meltable powder. It is not intended that the present invention be limited to powders having a particular melting temperature. In one embodiment, said meltable powder exhibits a melting temperature between 500 and 5000° C. It is also not intended that the present invention be limited to the nature of the particles used to make the powders. In one embodiment, said powder comprises metal particles. In one embodiment, said powder comprises ceramic particles. In one embodiment, said powder comprises cermet particles. In one embodiment, said powder comprises a mixture of ceramic and metal particles. In one embodiment, said powder comprises carbide particles. In one embodiment, said powder comprises glass particles. The powders can be mixtures of two or more particle types. In one embodiment, said powder comprises a mixture of polymer and metal particles. In one embodiment, said powder comprises a mixture of polymer and ceramic particles. In one embodiment, said powder comprises a mixture of polymer and glass particles. In one embodiment, said powder comprises a mixture of metal and glass particles. In one embodiment, said powder comprises a mixture of carbide and polymer particles. In one embodiment, said powder comprises a mixture of carbide and metal particles. In one embodiment, said powder comprises a mixture of carbide, cermet, and metal particles. In one embodiment, said powder comprises a mixture of carbide, cermet, and polymer particles. In one embodiment, said powder comprises a mixture of ceramic, metal, and polymer particles. In one embodiment, said powder comprises a mixture of metal, glass, and polymer particles. In one embodiment, said powder comprises a mixture of carbide, metal, and polymer particles. In one embodiment, said powder comprises Titanium alloy particles and has a porosity of approximately 10%. In one embodiment, said powder comprises first and second groups of particles, said particles of said first group having an average particle volume that is at least 25 times larger than the average particle volume of said particles of said second group. In one embodiment, said powder comprises first and second groups of particles, said particles of said first group having an average particle volume that is between 25 and 2000 times larger than the average particle volume of said particles of said second group. In one embodiment, said powder comprises a 62.8%: 16.2%: 16.7%: 4.3% mixture (by volume) of a first group comprising approximately 10 micron particles, a second group comprising approximately 2 micron particles, a third group comprising approximately 200 nanometer particles, and a fourth group comprising approximately 40 nanometer particles, respectively, said powder having a porosity of approximately 4.4%. In one embodiment, said energy source is a laser. In one embodiment, said granular composite is in a solvent. In one embodiment, said granular composite is in a paste.

The present invention also contemplates layers. In one embodiment, the present invention contemplates a layer of a granular composite powder, said layer less than 1000 microns in thickness, said powder having a porosity of 20% or less. In one embodiment, said powder is sinterable. In one embodiment, said powder is fusible. In one embodiment, said powder is meltable. Again, it is not intended that the present invention be limited to the nature of the particles used to make the powders. In one embodiment, said powder comprises metal particles. In one embodiment, said powder comprises ceramic particles. In one embodiment, said powder comprises cermet particles. In one embodiment, said powder comprises carbide particles. Again, mixtures of particles are contemplated. In one embodiment, said power comprises a mixture of ceramic and metal particles. In one embodiment, said power comprises a mixture of ceramic, metal and polymer particles. In one embodiment, said powder comprises Titanium alloy particles and has a porosity of approximately 10%. In one embodiment, said powder comprises first and second groups of particles, said particles of said first group having an average particle volume that is at least 25 times larger than the average particle volume of said particles of said second group. In one embodiment, said powder comprises first and second groups of particles, said particles of said first group having an average particle volume that is between 25 and 2000 times larger than the average particle volume of said particles of said second group. In one embodiment, said powder comprises a 62.8%: 16.2%: 16.7%: 4.3% mixture of a first group comprising approximately 10 micron particles, a second group comprising approximately 2 micron particles, a third group comprising approximately 200 nanometer particles, and a fourth group comprising approximately 40 nanometer particles, respectively, said powder having a porosity of approximately 4.4%. In one embodiment, said layer is positioned on a second layer of a granular composite powder, said second layer less than 1000 microns in thickness, said powder having a porosity of 20% or less. In one embodiment, both layers are approximately 50 microns in thickness. In one embodiment, said granular composite powder is in a solvent. In one embodiment, said granular composite powder is in a paste.

The present invention also contemplates methods for making layers. In one embodiment, the present invention contemplates a method of producing layers comprising the steps of: a) providing a source of a granular composite powder having a porosity of 20% or less; b) depositing a first portion of said powder onto a target surface; c) depositing energy into the powder of said first portion under conditions that said energy causes sintering, fusing or melting of the first powder portion so as to create a first layer; d) depositing a second portion of powder onto said first layer; and e) depositing energy into the powder of said second portion under conditions that said energy causes sintering, fusing or melting of the second powder portion so as to create a second layer positioned on said first layer. It is not intended that the present invention be limited by the energy source. In one embodiment, the energy is deposited by a laser. In one embodiment, step c) comprises focusing the laser with at least one lens. It is not intended that the present invention be limited to layers of a particular thickness. However, in one embodiment, said first and second layers are less than 100 microns (or less than 50 microns) in thickness. It is not intended that the present invention be limited by the nature of the particles used to make the powder. In one embodiment, said powder comprises metal particles. In one embodiment, said powder comprises ceramic particles. In one embodiment, said powder comprises cermet particles. In one embodiment, said powder comprises carbide particles. In one embodiment, said powder comprises a mixture of ceramic and metal particles. In one embodiment, said powder comprises a mixture of ceramic, metal and polymer particles. In one embodiment, said powder comprises Titanium alloy particles and has a porosity of approximately 10%. It is also not intended that the present invention be limited by the number of groups of particles. In one embodiment, said powder comprises first and second groups of particles, said particles of said first group having an average particle volume at least 25 times larger than the average particle volume of said particles of said second group. In one embodiment, said powder comprises first and second groups of particles, said particles of said first group having an average particle volume that is between 25 and 2000 times larger than the average particle volume of said particles of said second group. In one embodiment, said powder comprises a 62.8%: 16.2%: 16.7%: 4.3% mixture of a first group comprising approximately 10 micron particles, a second group comprising approximately 2 micron particles, a third group comprising approximately 200 nanometer particles, and a fourth group comprising approximately 40 nanometer particles, respectively, said powder having a porosity of approximately 4.4%. In one embodiment, said granular composite powder is in a solvent. In one embodiment, said granular composite powder is suspended in a paste.

The present invention also contemplates making layers using two or more different powders. In one embodiment, the present invention contemplates a method of producing layers comprising the steps of: a) providing first and second granular composite powders, each of said powders having a porosity of 20% or less; b) depositing said first powder onto a target surface; c) depositing energy into said first powder under conditions such that said energy causes sintering, fusing or melting of said first powder so as to create a first layer; d) depositing said second powder onto the first layer; and e) depositing energy into said second powder such that said energy causes sintering, fusing or melting of said second powder so as to create a second layer. Again, it is not intended that the present invention be limited by the energy source. In one embodiment, said energy is deposited by a laser. Again, it is not intended that the present invention be limited to layers of a particular thickness. In one embodiment, said first and second layers are less than 100 microns (or less than 50 micros) in thickness. Again, the present invention is not limited to particular types of particles or particle combinations used to make the powders. In one embodiment, said first powder comprises metal particles. In one embodiment, said second powder comprises ceramic particles. In one embodiment, said first powder comprises cermet particles. In one embodiment, said second powder comprises a mixture of ceramic and metal particles. In one embodiment, said first powder comprises Titanium alloy particles and has a porosity of approximately 10%. In one embodiment, said first powder comprises first and second groups of particles, said particles of said first group having an average particle volume at least 25 times larger than the average particle volume of said particles of said second group. In one embodiment, said first powder comprises first and second groups of particles, said particles of said first group having an average particle volume that is between 25 and 2000 times larger than the average particle volume of said particles of said second group.

The systems, layers and methods described above can be used for 3D printing. With respect to powders used in 3D printing employing an energy source to sinter, melt, or fuse particles, lower porosity means more reproducible manufacture, higher thermal conductivity, and a higher efficiency of laser energy absorbed by the powder, among other advantages.

DEFINITIONS

Figure 1A:
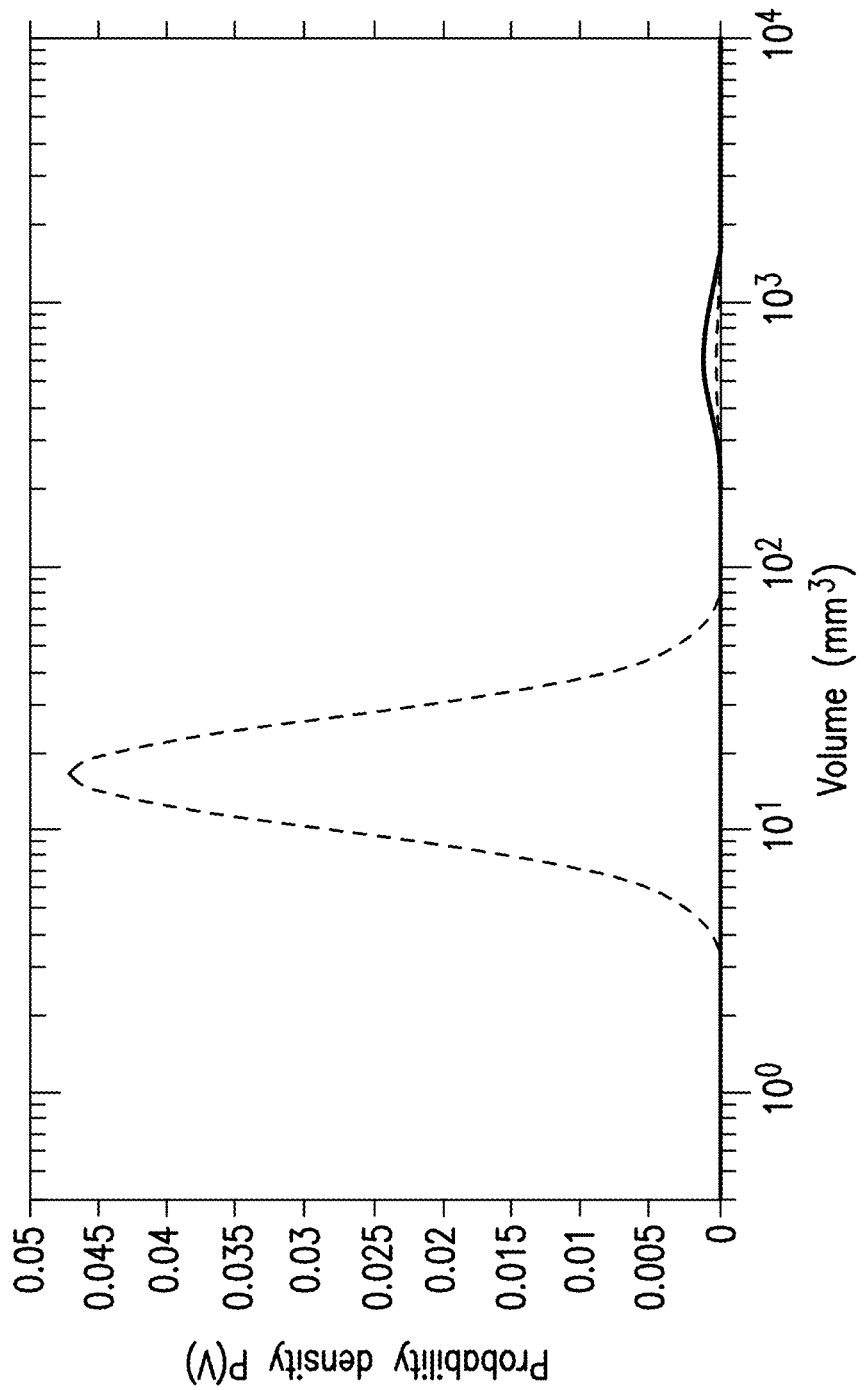
FIG. 1A is a plot of volume probability density curves for two groups of particles, group 1 with a mean volume $V_1^{avg}$ of 25 mm$^3$, maximum at $V_1$=18 mm$^3$, and standard deviation of (1/2) its mean (blue), and group 2 with a mean volume $V_2^{avg}$ of 1000 mm$^3$, maximum at $V_1$=716 mm$^3$, and a standard deviation of (1/2) its mean (green).

As used herein, the "TJ algorithm" refers to the method for generating disordered strictly jammed (mechanically stable) packings (a packing is a collection of nonoverlapping objects with specified positions) of spheres or nonspherical objects, as described in A. B. Hopkins, F. H. Stillinger, and S. Torquato, *Disordered strictly jammed binary sphere packings attain an anomalously large range of densities*, Physical Review E 88, 022205 (2013). The TJ algorithm approaches the problem of generating strictly jammed packings as an optimization problem to be solved using linear programming techniques. The objective function to be minimized in this optimization problem is chosen to be roughly equivalent to the negative of the packing fraction, where the packing fraction is the volume of space that the objects cover.

The space employed is a deformable unit cell in d dimensions with lattice vectors $M_\lambda = \{\lambda_1; \ldots; \lambda_d\}$ containing N objects under periodic boundary conditions. Each of the N objects is composed of different sizes of spheres, such that the spheres overlap and retain fixed positions with respect to one another, but not necessarily with respect to the other objects. Objects of any shape and size can be formed using overlapping spheres that are fixed in position relative to one another.

Starting from initial conditions of the packing of N objects at an arbitrary packing fraction, where random initial conditions at low packing fraction yield experimentally reproducible results, a linear programming problem is solved to minimize the volume of the unit cell for limited translations and rotations of the N objects, limited shear and compression of the cell, and under linearized nonoverlap conditions of the objects. This solution results in new coordinates and orientations for the objects, and a new unit cell with smaller volume. Using these new coordinates, orientations, and unit cell, a new linear programming problem is solved to minimize the unit cell under similar limited movement and nonoverlap conditions. This process is repeated until no further volume reductions in the unit cell are possible. The final solution of this sequential linear programming (SLP) process is guaranteed to be strictly jammed (mechanically stable).

The mathematical formulation of each linear programming problem is as follows. In this formulation, $r^\lambda_{ij} = x^\lambda_i - x^\lambda_j$ is the displacement vector for spheres with positions $x^\lambda_i$, in the basis of the unit cell lattice $M_\lambda$, between spheres i and j in the packing, $\Delta r^\lambda_{ij} = \Delta x^\lambda_i - \Delta x^\lambda_j$ are the change in displacement to be solved for during each SLP optimization step, and $\varepsilon = \{\varepsilon_{kl}\}$ is the strain tensor associated with the unit cell, with the $\{\varepsilon_{kl}\}$ also solved for during the SLP step. All $\Delta x^\lambda_i$ and eu are bounded from above and below to yield a limited movement range for the spheres during each step that is small compared to sphere diameters.

The value minimized is the trace of the strain matrix, $Tr(\varepsilon) = \varepsilon_{11} + \ldots + \varepsilon_{dd}$, which equivalent to the linearized change in volume of the unit cell. In addition to the upper and lower bounds on $\Delta x^\lambda_i$ and $\varepsilon_{kl}$, each $\Delta x^\lambda_i$ and $\varepsilon_{kl}$ must obey the linearized nonoverlap constraints for each pair i,j of different spheres. These constraints are written, $M_\lambda \cdot r^\lambda_{ij} \cdot \varepsilon \cdot M_\lambda \cdot r^\lambda_{ij} + \Delta r^\lambda_{ij} \cdot M^T_\lambda \cdot M_\lambda \cdot r^\lambda_{ij} \geq (D^2_{ij} - r^\lambda_{ij} \cdot M^T_\lambda \cdot M_\lambda \cdot r^\lambda_{ij})$, with $D_{ij}$ the average diameter of spheres i and j. For each nonspherical object, when spheres i and j are part of the same object, these spheres not have to obey the linearized nonoverlap constraints. Rather, their positions are fixed relative to a single reference sphere, one reference sphere per object, such that their individual displacement is determined entirely by the displacement and orientation of the reference sphere. For this purpose, two additional orientation variables $\varphi_i$ and $\theta_i$ are required for each reference sphere, such that the $\varphi_i$ and $\theta_i$ for each reference sphere must be bounded from above and below just as are the $\Delta x^\lambda_i$ and $\varepsilon_{kl}$, and solved for at each SLP step.

Friction is also incorporated into the TJ algorithm via a sphere "stickiness" probability $P_f$, $0 \leq P_f \leq 1$, and distance $x_f$. When two objects contact one another at a certain point (i.e., fall within distance $x_f$ of one another) after an SLP step, on the next SLP step, they maintain that contact with probability $P_f$ via restrictions in each object's translation and orientation. The larger the values of $P_f$ and $x_f$, the greater the friction. The value $P_f = 0$ corresponds to frictionless or very low-friction objects.

In a two-phase heterogeneous medium (also called "structure"), the variance $\sigma_i^2(R)$ of the local volume fraction of either phase is equal to $(1/v(R)) * Int(\chi(r) * \alpha(r; R) dr)$, where "r" is a vector in d-dimensional Euclidean space, "dr" an infinitesimal volume element in that space, v(R) is the volume of a sphere of radius "R" in "d" dimensions, $\chi(r)$ is the autocovariance function, $\alpha(r; R)$ is the scaled intersection volume, and the integral "Int" runs over the entire space.

If the structure is hyperuniform, then the number variance $\sigma_i^2(R)$ grows proportionally only as fast as $(1/R)^{d+1}$, rather than $(1/R)^d$. This is equivalent to saying that, in the limit as $\|k\|$ approaches zero, the spectral density, which is the Fourier transform of the autocovariance function $F[\chi(k)]$, is equal to zero, where $\|\cdot\|$ indicates the Euclidean distance and $F[\cdot]$ the Fourier transform.

Consider a two-phase medium where the one phase consists of granular particles of any material, type, size or composition, and the other is void space, a solvent, a gel, a paste, or some other type of fill-material. For this medium, which is a granular composite, the local volume fraction of phase "i" at point "$z_0$" for a given "R" is defined as the fraction of space belonging to phase "i" contained within a d-dimensional sphere of radius "R" centered at point "$z_0$". The variance $\sigma_i^2(R)$ for phase "i" of local volume fraction is the variance of local volume fraction over all points "$z_0$" in the medium. Such a variance for a two-phase medium does not depend of which phase one considers, as is indicated in the above mathematical description of $\sigma_i^2(R)$ in terms of the autocovariance function $\chi(r)$ and scaled intersection volume $\alpha(r; R)$.

The autocovariance function $\chi(r)$ in a two-phase heterogeneous medium can be written in terms of the two-point probability function $S_2^i(r)$ and the volume fraction $\varphi_i$ as $\chi(r) = S_2^i(r) - \varphi_i^2$, where choosing either phase "i" yields the same $\chi(r)$. The two point probability function $S_2^i(r)$ for phase "i" is equal to the probability that the end points of a line segment of length $\|r\|$ oriented along the direction of "r" both fall in phase "i", and the volume fraction $\varphi_i$ is the fraction of space covered by phase "i". The scaled intersection volume $\alpha(r; R)$ is equal to the union of two d-dimensional spheres of radius "R" separated by distance "r". For more details, see C. E. Zachary, Y. Jiao, and S. Torquato, *Hyperuniform long-range correlations are a signature of disordered jammed hard-particle packings*, Physical Review Letters 106, 178001 (2011).

For a finite number of constituent particles, the limit of the spectral density $F[\chi(k)]$ as $\|k\|$ approaches zero must be defined in more detail, as only in the limit of infinite space and infinite particles does $\|k\|$ reach zero. For a finite group of particles, the values of $\|k\|$ chosen must be limited such that $\|k\| > 1/L$, where "L" is the linear extent of the system size. In this case, the limit as $\|k\|$ approaches zero can be defined by fitting a curve to $F[\chi(k)]$ for the smallest few points of $\|k\|$ and extrapolating such that that fitted curve includes the point $\|k\|=0$. A structure is defined as "nearly-hyperuniform" if the limit as $\|k\|$ approaches zero, in units of $F[\chi(k)]/<V^{1/d}>^2$ with $<V^{1/d}>$ the average effective diameter of the constituent particles, is less than the value "0.01".

The value "0.01" is chosen to reflect the degree of long-range spatial correlations present in certain types of systems. For example, all crystalline and quasi-crystalline arrangements of particles are hyperuniform, as are maximally random jammed arrangements of spheres. All of these systems express long range ordering between particles: in a crystal, the position of each particle is fixed relative to the position of its neighbors, and in a maximally random jammed arrangement of spheres, the pair correlation function decays as $-1/r^{d+1}$, with "r" the distance between points (see A. Donev, F. H. Stillinger, and S. Torquato, *Unexpected density fluctuations in jammed disordered sphere packings*, Physical Review Letters 95, 090604 (2005)). In a liquid, the pair correlation function decays exponentially fast, and, for example, in the limit as $\|k\|$ approaches zero for the hard sphere liquid, $F[\chi(k)]$ is equal to about 0.028. Generally speaking, the smaller is $F[\chi(k)]$ in the limit as $\|k\|$ approaches zero, the smaller the growth of the number variance $\sigma_i^2(R)$ in "R", and the greater the spatial correlation between particles at large distances.

DESCRIPTION OF THE INVENTION

A granular composite density enhancement process is described for granular composites with constituents of all sizes, shapes, and physical characteristics. The process consistently results in composites that exhibit a combination of lower porosity and viscosity than known, in general practice, to be obtainable given particles within a range of relative sizes, where particle size, unless otherwise stated, refers to the volume of space occupied by a given single particle. This process also leads to reduced phase separation of particles, where the separation of particles into distinct size groups is a significant practical hurdle in producing dense composites when many groups of particles with large size differences between groups are used as composite constituents. The process, which involves the tailored mixing of specially-chosen size groups of particles in targeted ratios, produces structures, and therefore a composition of matter, of a type heretofore unidentified. These structures are distinguishable through their physical properties, including porosity and viscosity, and also through statistical measures including but not limited to structure pair correlation functions, contact distributions, and volume distributions of constituents. Specifically, certain specific features exhibited by the aforementioned statistical measures on these structures are not exhibited by the statistical measures on those granular composite structures that are commonly known.

This process has a number of applications due to desirable reduction in porosity, reduction in viscosity, reduction in tendency to phase separate, or a combination of all three factors, and due to the desirable physical and related economic properties caused by and correlated to reductions in porosity, viscosity and phase separation. The desirable physical properties include but are not limited to, greater bulk modulus, elastic moduli, shear moduli, durability, hardness, flowability (ease of flow), thermal conductivity, heat capacity, electrical conductivity, overall absorption of laser (and other photonic) energy, and overall absorption of heat (and phononic energy), as well as reductions in interface energies with "bulk" molecular solids, thermal expansion coefficient, skin depth of absorption of laser (and other photonic) energy, and skin depth of absorption of sonic energy. The desirable economic properties include but are not limited to, decreased cost of composite components, increased reproducibility and repeatability of processing of, and more uniform processing of, granular composites. The applications where these properties are valuable include but are not limited to: 1) additive manufacturing ("3D printing") involving metallic, ceramic, cermet, polymer, plastic, or other dry or solvent-suspended powders or gels or slurries, 2) concrete materials, 3) solid propellant materials, 4) cermet materials, 5) granular armors, 6) glass-metal and glass-plastic mixtures, and 7) ceramics comprising (or manufactured using) granular composites.

In additive manufacturing, a material, often a powder, must be placed in a desired spatial form and then reacted with (usually by heating) the solid material beneath it so that the first material changes phase and bonds with the solid, becoming solid itself. In these cases, the benefits of lower porosity and viscosity can include but are not limited to: more even heating and melting of the granular composite, ease of placement and more even placement of the composite, increased overall laser absorption and reduced skin depth of absorption, decreased lateral scattering of energy in the composite, reduced oxidation of the composite, and reduced temperature gradient across the composite and consequently across the melted and resolidified solid derived from the composite.

In concrete materials, lower-porosity mixtures of aggregate that still flow at the requisite rate permit reductions in paste material required to fill the voids between aggregate and "glue" the aggregate together. These paste materials, generally including Portland cement, are often the most expensive components of the concrete, and therefore their reduction is highly desirable. Additionally, reductions in aggregate porosity in concrete are often correlated with exponentially increasing strength, including bulk modulus, elastic and shear moduli, hardness and longevity.

In solid propellant materials, which are often granular composites, a reduction in porosity and associated increase in density leads to increase in propellant thrust, which can depend on the square of composite density. Increased thrust is desirable due to the increased ability to lift loads, increased speed of rocket, and other desirable advantages.

In cermet materials, granular armors, ceramics comprising (or manufactured using) granular composites, glass metal mixtures, and glass plastic mixtures, reduced porosity leads to greater strength including but not limited to greater bulk modulus, elastic and shear moduli, hardness and longevity. It generally also leads to increases in durability under thermal stress cycling. These properties are often desirable in these materials due to their uses as protective barriers, load-bearing structural materials, and high-temperature and stress/strain durable materials.

A. Properties of the New Composition of Matter

The study of mechanically stable multimodal mixtures of granular particles has led to the identification of a new composition of matter. This composition of matter may exhibit properties similar to both those of a liquid and those of a solid, for example, in that, like a liquid, it may flow when a sufficient external force (such as gravity) deforms its equilibrium shape, but, like a solid, it may withstand small but non-zero bulk and shear stresses without deformation. This composition of matter may, like a powder, exhibit both solid-like and liquid-like properties simultaneously. This composition of matter is a granular composite, in the sense defined previously in this document, in that it can appear in a powder-like form, in a slurry-like (liquid) form, or in a solid-like form when its constituents have been fixed in place by a "paste" or "glue".

Processes for producing this composition of matter will be discussed later. In this section, the defining features and identification of this composition of matter are discussed. This composition of matter is distinguishable through its physical properties, including porosity and viscosity, and also through statistical measures including but not limited to structure pair correlation functions, contact distributions, and volume distributions. This section discusses certain specific features exhibited by the aforementioned statistical measures on these structures that are not exhibited by the statistical measures on granular composite structures that are commonly known.

This composition of matter is defined by the structure and composition of its underlying granular constituents. The class of structures that comprise this composition of matter will hereafter be termed Dense Small-size-range Multimodal Granular (DSMG) structures, as certain members of this class of structures are unusually dense for granular structures considering the small range of sizes spanned by their constituent particles.

In the following paragraphs, it is assumed that a granular composite and DSMG structure is composed of at least approximately 100 particles. Generally, DSMG structures can be and are composed of far more than 100 particles, but, due to the random nature of the mixing of constituent particles in a granular composite, at least roughly 100 particles are necessary for DSMG structural features to become apparent.

All DSMG structures and the mixture of their constituent particles exhibit the following characteristics:

1. DSMG structures are composed of constituent particle sizes exhibiting volume probability density functions $P(V)$ (also referred to simply as volume distributions, or particle size distributions), containing two or more local maxima associated with adjacent sufficiently-sized particle groups. To define particle groups that are both "adjacent" and "sufficiently sized", it is first helpful to replot the volume distribution of the granular composite as a specific type of passing curve that retains the maxima and minima (though they may occur at slightly different points) present in the volume distribution $P(V)$. Subsequently, the granular composite can be divided into groups of particles according to this passing curve. The replotting of a volume distribution as a passing curve is required to view maxima and minima occurring at different volumes on a comparable scale.

1a. The volume distribution can be plotted as a set of points $V_{S,i}$, where this set of points is called a passing curve $PC_S(V_{S,i})$, in the following fashion. For a range of volumes spanning from the volume of the smallest particle to the volume of the largest particle in the composite, volume intervals are selected on a geometric scale. That is to say, each interval begins at $X(i)=S^i$ and ends at $X(i+1)=S^{i+1}$, where the "i" are integers $i=m \ldots n$ (with "m" and "n" either or both possibly negative) such that for some appropriately chosen scalar $S>1$, "S" to the power of "n" is greater than the volume of the largest particle, and "S" to the power of "m" is smaller than the volume of the smallest particle. A scalar $S=S_0$ must be chosen to be at least small enough such that for all $S$, $1<S\leq S_0$, the number and associated maxima and minima of sufficiently-sized of particle groups determined by $S$ remains constant. This means that there will be a one-to-one correspondence between the local extrema (maxima and minima) in the volume distribution $P(V)$ and the passing curve $PC_S(V_{S,i})$, where the extrema considered are those associated with sufficiently-sized particle groups. Consequently, the corresponding local maxima and minima in both the curves $P(V)$ and $PC_S(V_{S,i})$ associated with sufficiently-sized particle groups can be spoken of interchangeably.

Figure 1B:
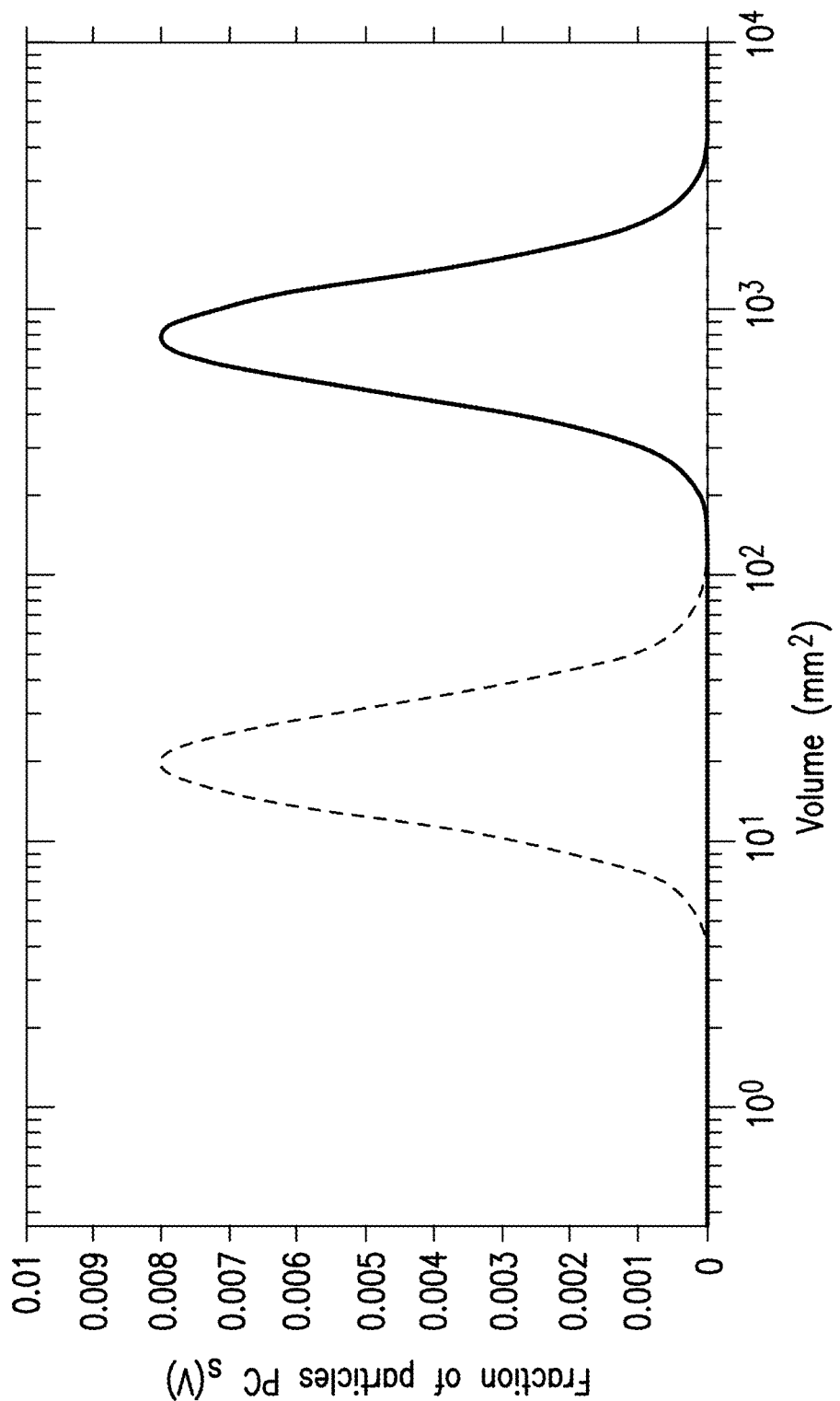
FIG. 1B shows passing curves for the same two particle groups, plotted for S=1.01005, assuming that each particle group contains the same total volume of particles. The Y-axis of FIG. 1B is labeled "Fraction of particles" to emphasize that the scaling of the axis is dependent on the parameter S, though if each point $V_{S,i}$ were plotted, each point would represent the volume of particles between the points 0.5*($V_{S,i-1}$+$V_{S,i}$) and 0.5*($V_{S,i}$+$V_{S,i+1}$), and the units of the axis would be volume (mm$^3$). It is of note that, due to the normalization to unity of the integral of P(V), information about the relative number of particles in each group is not present in FIG. 1A, or generally when comparing P(V) for different groups of particles. However, a passing curve or probability density function for an already-combined composite will retain this information. It is also of note that in the graphs depicted, the locations of the maxima $V_1$ and $V_2$ are not the same, with the maxima in the passing curves (bottom) occurring at about $V_1$=28.1 and $V_2$=1113.2. Plotting the volume probability curves as passing curves repositions maxima and alters height and standard deviations in such a way as to allow direct comparisons between particle groups.

Provided a suitably small "S", the integral of the volume distribution times volume $P(V)V$ is taken over each interval and the result plotted at the midpoint of each interval; that is, for each $i=m \ldots 0 \ldots n-1$, $Int\_X(i)^{\wedge}(i+1)P(V)VdV$ is plotted at the volume point $V_{S,i}=(1/2)*(X(i)+X(i+1))$. To view the relative standard deviations (standard deviation divided by mean) of particle groups on a comparable scale, the points $PC_S(V_{S,i})$ should be plotted with the volume axis on a logarithmic scale. The resultant passing curve $PC_S(V_{S,i})$ is similar or exactly comparable to passing curves created by sieving particles using standard sieves because standard sieves exhibit geometrically scaled mesh sizes. A smooth curve $PC_S(V)$ can be created from the set of points $PC_S(V_{S,i})$ simply by interpolating between points using any standard method. Both curves $PC_S(V)$ and $PC_S(V_{S,i})$ exhibit the property that the sum over all $i=m \ldots n$ of $PC_S(V_{S,i})$ is equal to the average particle volume $V^{avg}$, just as the integral of $P(V$ from $V_{S,m}$ to $V_{S,n}$ is equal to the average particle volume. A replotting of a volume distribution P(V) to a passing curve $PC_S(V_{S,i})$ is depicted in FIG. 1.

1b. Once plotted, the passing curve can be simply divided into mutually exclusive contiguous volume ranges, and accordingly, the granular composite particles into size groups such that the endpoints of each volume range bound from below and above the size of particles within the group. Particles with volumes falling at the endpoints can be placed in either group having that endpoint. The volume ranges are defined such that each represents a particle group of "sufficient size", and such that the upper and lower bounds of the range lie at a local minimum falling at volumes between local maxima associated with particle groups of sufficient size. An example and the definition of "sufficient size" follows. From a passing curve, described in section 1a) above, consider two local maxima occurring at volumes $V_2$ and $V_3$, $V_3 > V_2$, such that the average particle volumes $V_2^{avg}$ and $V_3^{avg}$ of particles in groups associated with their respective local maxima $V_2$ and $V_3$ obey $V_3^{avg}/V_2^{avg} <= 10,000$. This latter condition is one of two necessary for the particle groups to be considered "adjacent". For these local maxima to be associated with particle groups that are sufficiently sized requires that: a) of all local minima occurring between the two local maxima considered, there must be a local minimum "2-3" with size $PC_S(V_{2-3})$ occurring at $V_{2-3}$, that is at most 75% of the size of the smaller of the two local maxima sizes $PC_S(V_2)$, $PC_S(V_3)$ and b) over some volume range $[V_l, V_r]$, such that $V_l < V_2^{avg} < V_3^{avg} < V_r$ and $V_r/V_l = 10,000$, both i) the sum over all i of $PC_S(V_{S,i})$ where the $V_{S,i}$ are within the range spanning a local minimum occurring at $V_{1-2}$ between adjacent local maxima at $V_1$ and $V_2$, and $V_{2-3}$, must be at least 2% of the value of the sum over all i of $PC_S(V_{S,i})$ where the $V_{S,i}$ are within the range $[V_l, V_r]$, and ii) the sum over all i of $PC_S(V_{S,i})$ where the $V_{S,i}$ are within the range spanning $V_{2-3}$ and a local minimum occurring at $V_{3-4}$ between adjacent local maxima at $V_3$ and $V_4$, must be at least 2% of the value of the sum over all i of $PC_S(V_{S,i})$ where the $V_{S,i}$ are within the range $[V_l, V_r]$. If there is no local maximum of sufficient size $V_1$ smaller than $V_2$, then a volume V just smaller than the smallest particle size is taken instead, and if there is no local maximum of sufficient size $V_4$ larger than $V_3$, then a volume V just greater than the largest particle size is taken instead. If there are several local minima between a pair of local maxima, any of the local minima can be chosen, and all must be considered to check if the criteria a) and b) can be met. It is important to note that criterion a), after being successively applied to the maxima of an entire granular composite, requires that both minima associated with (one to each side of) a local maximum of a sufficiently-sized particle group have values $PC_S(V)$ that are no more than 75% of the value of the local maximum in between them.

Figure 2:
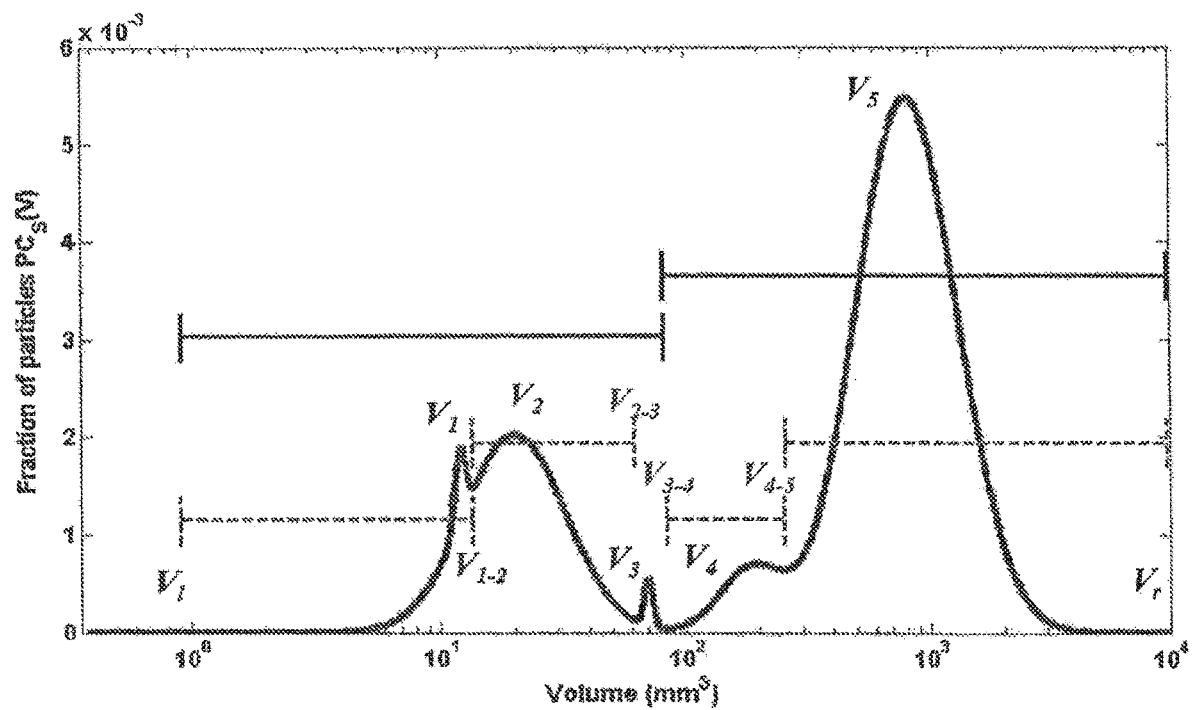
FIG. 2 provides an example of a passing curve plotted with S=1.00958 that includes 5 local maxima (labeled $V_1$ to $V_5$). For this distribution of particles, there are two "sufficiently sized" particle groups corresponding to the maxima at $V_2$ and $V_5$, and represented by the volume ranges [$V_1$, $V_{3-4}$], and [$V_{3-4}$,$V_r$], respectively. These particle groups are also adjacent, both because there are no other sufficiently sized particle groups between them, and because the ratio of larger to smaller average volume of particles in the groups is less than 10,000. The maximum at $V_1$ is not associated with a particle group that is sufficiently sized because the smallest minima at $V_{1-2}$ between the maxima at $V_1$ and $V_2$ is of a height $PC_S(V_{2-3})$ that is greater than 75% of the height $PC_S(V_1)$ of the maximum at $V_1$. The particle group corresponding to the maximum at $V_3$ is not sufficiently sized because the integral of P(V)V, with P(V) calculated from the passing curve $PC_S(V_{S,i})$, over the range [$V_{2-3}$,$V_{3-4}$] (alternatively, the sum of all $PC_S(V_{S,i})$ in the same range) is less than 2% of the integral of P(V)V over [$V_l$,$V_r$] (alternatively, the sum of all $PC_S(V_{S,i})$ in the same range). The maximum at $V_4$ is not associated with a particle group that is sufficiently sized because, similarly to the maximum at $V_1$, the height $PC_S(V_{4-5})$ of the minimum at $V_{4-5}$ is greater than 75% of the height $PC_S(V_4)$ of the maximum at $V_4$.

The second condition for the two particle groups with maxima occurring at volumes $V_2$ and $V_3$ to be "adjacent" is that there must be no other local maxima in $PC_S(V)$ occurring at any volume $V_{bt}$, $V_2 < V_{bt} < V_3$, such that both the pair of maxima occurring at volumes $V_2$ and $V_{bt}$ and the pair of maxima occurring at volumes $V_{bt}$ and $V_3$ meet criteria a) and b) for being "sufficiently-sized". Any granular composite divided into particle groups according to the criteria just-described, such that all sufficiently sized groups are separated, must contain at least one pair of adjacent sufficiently-sized particle groups for the composite to form a DSMG structure. The volume probability density functions or passing curves referenced can be determined by sieving, centrifuging, image analysis, or any other general established means. In particular, it is not necessary that the functions determined be exact, but only to of a level of accuracy commonly obtained by general established means of measuring such functions. FIG. 2 contains an example of particle group definition using a passing curve.

2. When mixed, spatial phase separation of particles into the particle groups associated with local maxima in passing curves according to the criteria described in Characteristic 1 above cannot occur for all groups across all spatial regions. Further, all DSMG structures must exhibit some spatial mixing of particles from at least two adjacent sufficiently-sized groups. This means that, for composites in their powder form, spatial mixing will include contacts between particles in different groups in some regions of space within the composite where the region height, width, and depth are at least in size on the order of several lengths of the largest particles from the group with larger-volume particles.

3. When in powder form, i.e., such that no liquid or other matrix material fills the void space between constituent particles, DSMG structures have the property that: for a structure composed of n groups of particles $G_i$ in masses $M_i$, with the groups defined as in Characteristic 1 above, at least one pair of groups of particles $G_i$ and $G_j$ (with i and j integers ranging over all n such that i does not equal j), when mixed in masses $M_i$ and $M_j$, yields a volume greater than that of either of the volumes of the individual groups $G_i$ or $G_j$ on its own. As a consequence of particle group volume dependence on preparation method, this characteristic generally requires similar methods of preparation and measurement for the volumes of single groups of particles and mixtures of two groups of particles. Specifically, this characteristic excludes from the class of DSMG structures those granular composites that, in powder form, exhibit the property that: every group of particles, when mixed in the same quantities that they are mixed in the composite, form mechanically stable structures comprising only particles from the group with larger volume particles, where the particles from the group with smaller volume particles are present only in the voids created by the mechanically stable structure composed solely of particles from the group with larger particles.

4. Consider all sets of particle groups in a granular composite, with groups defined as in characteristic 1 above, such that in each set, the average particle volume of the group of largest particles is no more than 10,000 times larger than the average particle volume of the group of smallest particles. With these divisions considered, DSMG structures require:

4a. It is possible to divide at least one set such that at least one pair of adjacent particle groups in the set (when particle groups are ordered by average particle volume of the group) exhibits the property that the volume in the "larger" of the two groups is at least 20% of the total volume of particles in the pair of particle groups, and such that the total volume of particles in the "smaller" group is at least 10% of the total volume of the pair of particle groups. If for every pair of particle groups in every set of particle groups, it is not possible to meet these conditions, then the granular composite generally will not form a DSMG structure.

4b. For the entire composite in its powder form, considering all pairs of adjacent particle groups in all sets of particles as before, for at least one set, the average number of larger nearest-neighbor particles for the particles in the larger group is greater than or equal to one. A "nearest-neighbor" with volume $V_{nn}$ to a given "central" particle with volume $V_c$ is defined as a particle that can be put in contact with the central particle by moving it a distance less than $R_s$, where $R_s = ((3V_{nn}/4\pi)^{1/3} + (3V_c/4\pi)^{1/3})/2$ is the average sphere-equivalent particle radius of the two particles. Nearest neighbors can be identified by many techniques, including "freezing" a powder structure in place using special "glues" or "pastes" meant for that purpose and performing image analysis of cross-sectional slices of the resulting solid, and through careful examination, by those skilled in the art, of both the pair correlation function (obtainable via standard scattering experiments) and volume probability density functions of the composite. The method of determining nearest neighbors is not relevant to the DSMG structure, though reasonably accurate methods are necessary to obtain reasonably accurate results.

Characteristic 1 above describes DSMG granular composites in terms of groups of particles of different sizes. It eliminates from the class of DSMG structures those structures formed from unimodal size distributions of particles (only one particle group, as defined in Characteristic 1), and reflects the requirement that a particle group have a minimum total volume (relative to a given range of volumes) in order for that group of particles to contribute to the formation of DSMG structural characteristics. It also requires that the ratio of larger to smaller average particle size in adjacent particle groups not be too large. Characteristic 2 specifies one structural feature possessed by DSMG structures. Characteristic 3 describes a method of determining whether or not DSMG structural characteristics can be present in a granular composite composed of particle groups with some physical characteristics specified, via statistical measures of a structure's constituent particles. Characteristic 4 specifies structural features exhibited by all DSMG structures, and a method of determining, using statistical measures, whether or not DSMG structural features can be present in a granular composite composed of particle groups with some physical characteristics specified. It eliminates from the class of DSMG structures those granular composites that consist of only sets of smaller and larger particles where the larger particles are more dilutely dispersed throughout the smaller particles and only rarely very close to or in contact with one another.

In addition to these 4 characteristics, all DSMG structures may exhibit one or more of the following characteristics:

A. Porosity less than 25% for a granular composite formed from only two groups of particles, with groups defined as in Characteristic 1 above.

B. Porosity less than 20% for a granular composite formed from three or more groups of particles, with groups defined as in Characteristic 1 above.

C. Hyperuniformity or near-hyperuniformity, as described in the Definitions section, while in its powder form without solvent, paste, liquid or gel between constituent particles.

Figure 3:
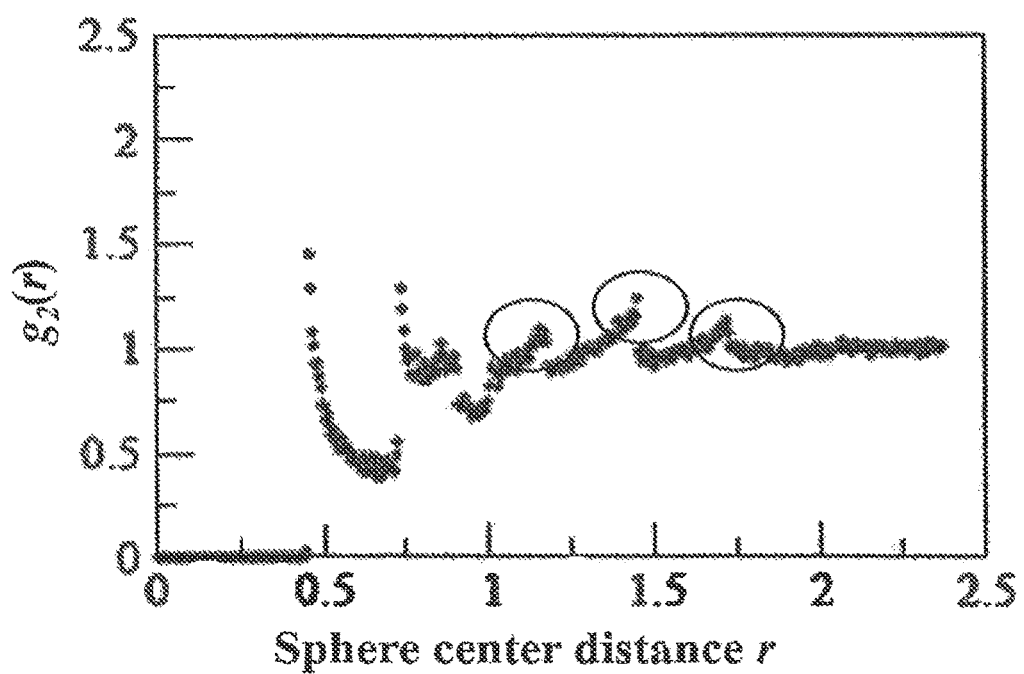
FIG. 3 shows the pair correlation function $g_2(r)$ for a binary mixture (two sizes) of spherical particles with the larger particles of diameter one and the smaller of diameter 0.45 (large to small volume ratio of 11), and with relative volume fraction $x_S$ of smaller particles equal to 0.267 (near the minimum in porosity for this size ratio of particles). Note the peaks (discontinuities) and linear behavior in $g_2(r)$ at distances r=1.175, r=1.4, and r=1.725. These discontinuities, which can be described as a sharp maximum followed by an immediate vertical drop, represent a higher probability of linear arrangements of the centers of contacting particles in clusters consisting of; two small and one large (r=1.175), one large between two smalls (r=1.4), and two larges and one small (r=1.725). The preference for these linear arrangements of the centers of three particles is unique to DSMG structures, but can only be easily detected for mixtures of particle groups where each and every particle group exhibits a particularly small size variation about the average size, i.e., the volume distributions P(V) for each individual particle group exhibits a small standard deviation.

D. An increased probability of, between at least one pair of particle groups, at least one of three roughly linear arrangements of the centers of mass of 3 particles, 2 particles from one group and 1 from the other. The three possible roughly linear arrangements are, for a group of particles of larger size and a group of particles of smaller size, large-large-small, large-small-large, or large-small-small. These clusters can be detected, for some composites, by observing the granular composite's pair correlation function, which is accessible via scattering experiments. An example of the detection of this feature is given in FIG. 3, which is a depiction of the pair correlation function of a binary mixture of spherical particles. For a composite comprising groups of particles, with groups defined as in Characteristic 1 above, where the particles within individual groups vary in size and shape, the pronounced peaks in pair correlation function probability at distances representing linear clusters of 3 particles, 2 from one group and 1 from another, will be flattened and rounded. In many DSMG structures, though this clustering will be present in the structure, the feature in the pair correlation function, displayed in FIG. 3, will not be detectable due to this flattening and rounding.

B. Process to Produce the Composition of Matter We here describe a process to produce granular composites with reduced porosity, reduced tendency to phase separate, and reduced viscosity, relative to those composites commonly known to be capable of being produced, for particles within specified ratios of largest volume particles to smallest volume particles. The composite structures produced often exhibit some or all of the structural and other physical characteristics described in the previous section.

It is generally known that granular composites can be produced with a variety of different porosities. For example, considering different arrangements of same-size spherical particles, mechanically stable composites can be constructed ranging from about 51% porosity to about 26% porosity. In this usage, "mechanically stable" means that the composite will withstand some non-negligible stress or shear in any direction without collapsing, deforming, or expanding, and therefore behaves like a solid over some range of stresses. However, the structures that realize the upper (51%) and lower (26%) porosity bounds mentioned are highly-ordered, meaning that exacting construction methods would be required to create structures realizing those porosities.

Considering same-size roughly spherical particles that are mixed thoroughly by vibration or shaking and that interact via friction and gravity, porosities of about 37% to 46% are common, depending on the exact shapes of the particles and the frictional coefficients between them. This "thoroughly mixed" composite is an important case to consider, because exact construction methods are not practical or even possible given the extremely large numbers of particles in most granular composites of interest. For example, only of handful of fine sand can contain over a billion particles, and the time required to build a structure one particle at a time from such a handful would be considerable.

When considering granular composites comprising particles of many different sizes and shapes, thoroughly-mixed, mechanically stable composite structures cover a broad range of possible porosities. For example, experiments with particles with sizes that are roughly log-normally distributed, have yielded porosities (roughly) of up to 60% and as low as 15%, depending on particle sizes, shapes, and frictional interactions, as well as the details of the composite preparation, including, for example, whether or not the composite was vibrated at high frequency or compacted. Log-normally distributed particle distributions are important for practical applications because many manufacturing methods and natural processes produce composites with log-normally distributed sizes. Examples of composites exhibiting roughly log-normal distributions of particle volumes include but are not limited to clods, dirt, sand, some types of crushed rock, and some types of nanoparticles produced via flame or chemical methods.

Research into concrete aggregate mixtures using cement, silica ash, sand and crushed rock suggests that specifically tailored mixtures of roughly log-normally distributed constituents can yield porosities as low as 15%. Most importantly though, for the lowest porosities to be achieved, the largest particles must have a far greater volume than the smallest particles. For example, in the research referenced, the largest particles have over 100 trillion times the volume of the smallest particles. F. de Larrard, *Concrete mixture proportioning*, Routledge, New York (1999).

In the academic literature, hypothetical constructions of composites with nearly 0% porosity are discussed. One way that this is theoretically accomplished is by creating a continuous distribution of particle sizes, for example, a distribution of particle volumes with an extremely large standard deviation, such that the smallest particles have volumes that are miniscule compared to the volumes of the largest particles, on the order of the volume difference between an atom and a boulder. In this way, when the size distribution is chosen correctly, void spaces between larger particles can always be filled by smaller particles, and 0% porosity can be approached (though never actually reached).

Another theoretical way, discussed in academic literature, to substantially reduce porosity is to use a discrete distribution of particle sizes, where the average volume of a particle in each successively smaller grouping of particles is small enough so that the smaller particles can easily fit through the spaces in the structure formed by larger particles. We term this the "discrete large ratio" approach to reflect that the composite must consist of groups of particles where each group exhibits a discrete average volume that is at minimum 10,000 times larger or smaller than all other average volumes of each group of particles in the composite. An additional requirement of these groups is that the standard deviation of particle volume distributions about the average volume not be so large that particle sizes in different groups substantially overlap. The volume ratio of 10,000 reflects a minimum size disparity necessary for smaller particles to fit into the void spaces created by a mechanically stable structure of larger particles, and for small clusters of these smaller particles not to form structures that interfere with the particle contacts between larger particles. Such clusters are discussed, for the case of composites of frictionless binary spheres, in A. B. Hopkins, F. H. Stillinger, and S. Torquato, *Disordered strictly jammed binary sphere packings attain an anomalously large range of densities*, Physical Review E 88, 022205 (2013).

When employing the discrete large ratio approach to create composites with low porosity, the volume of particles from each group must be chosen in precise ratios so that each successively smaller group fills entirely the void space between the last larger group. For example, considering four groups of low-friction spherical particles, each group consisting of roughly same-size particles with 100,000 less volume than a particle in next larger group, a mixture (by volume) of 64.5% largest particles, 23.6% second-largest, 8.6% third-largest, and 3.2% smallest particles could yield a structure with a porosity of about 2.5%. It is notable that in this example, the volume of the largest particles is one quadrillion (one thousand trillion) times that of the smallest particles.

It is also notable that, if vibrated or mixed after settling in a gravitational environment, particle groups in composites produced using the discrete large ratio approach will tend to phase separate, with the smallest group of particles on the bottom, topped by the second smallest, and so on finally with the largest group on top. This means that mixing or vibrating for increasing time periods will lead to decreasing porosity of the composite, with final porosity approaching 37% for the example just-described using low-friction spherical particles with small particle-group standard deviations. This type of phase separation can sometimes be avoided, most successfully when the ratio of larger to smaller average particle volumes between groups of particles is as small as possible (for the discrete large ratio approach, the smallest such ratio is roughly 10,000). In such cases, one way to avoid phase separation is by fabricating each larger group of particles out of a material that is substantially denser than the previous smaller group. Another way is to increase substantially the frictional interactions between particles, sometimes for sub-micron particles via electrostatic or Van der Waals forces, though this will also increase the overall composite porosity. Yet another approach to mitigate phase separation is to compact the combined particle distribution from above, or to employ "up-down" rather than "left-right" mixing. In general, the discrete large ratio approach described is not used in applications due to a) the cost of fabricating particles that are very similar in size for each group, b) the difficulty in fabricating particle groups where particles have volumes that are many trillions of times larger or smaller than those particles in other groups, and c) the difficulty in overcoming particle phase separation.

It is not yet generally known among those skilled in the art or the general public that another approach is possible to substantially reduce composite porosity, where this approach can be applied to any set of several groups of particles exhibiting different size distributions, shapes, frictional interactions, or other physical properties. This approach does not require individual particle volume differences that are as large as in the discrete large ratio approach previously described. Further, the composites produced by this approach do not phase separate nearly as easily as those in the discrete large ratio approach previously described, in part because the difference in particle volumes between groups is not as great. This latter approach, which is described in detail herein, is termed the granular composite density enhancement process (GCDEP).

Figure 4A:
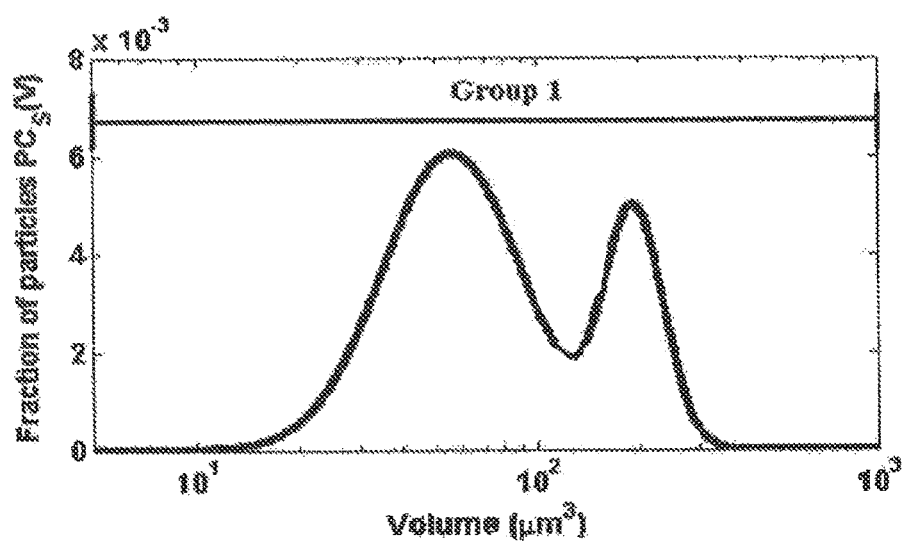
FIG. 4A shows an example passing curve for a grouping of particles that can be considered as two sufficiently sized groups.
Figure 4B:
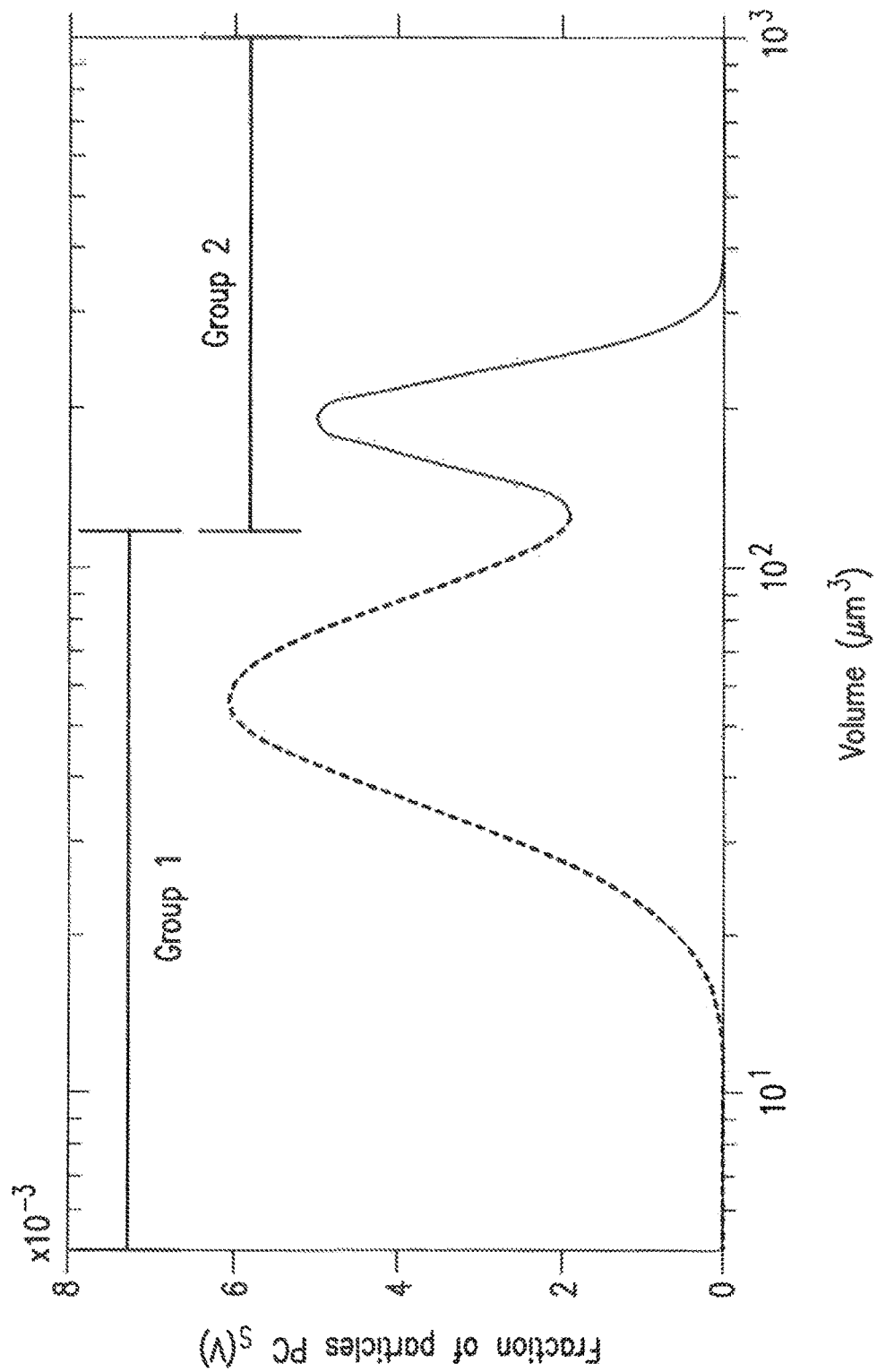
FIG. 4B shows the example division of grouping of particles into two sufficiently sized groups
Figure 5A:
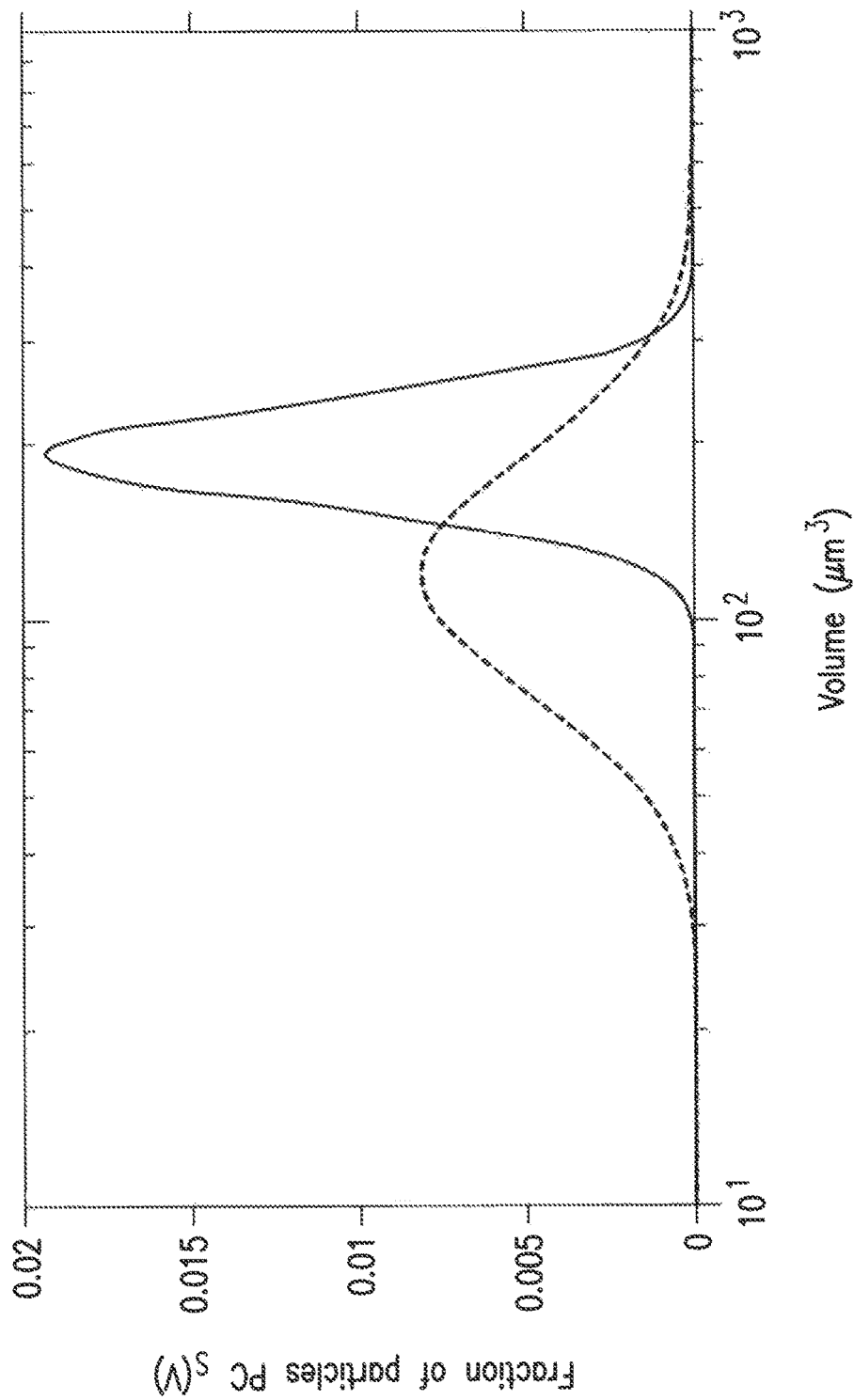
FIG. 5A shows an example of passing curves for two groupings of particles that should be considered as one, since no combination of relative volumes of particles from group one (blue, lower maximum) and group two (green, higher maximum) can lead to a combined passing curve where two sufficiently sized particle groups are present.
Figure 5B:
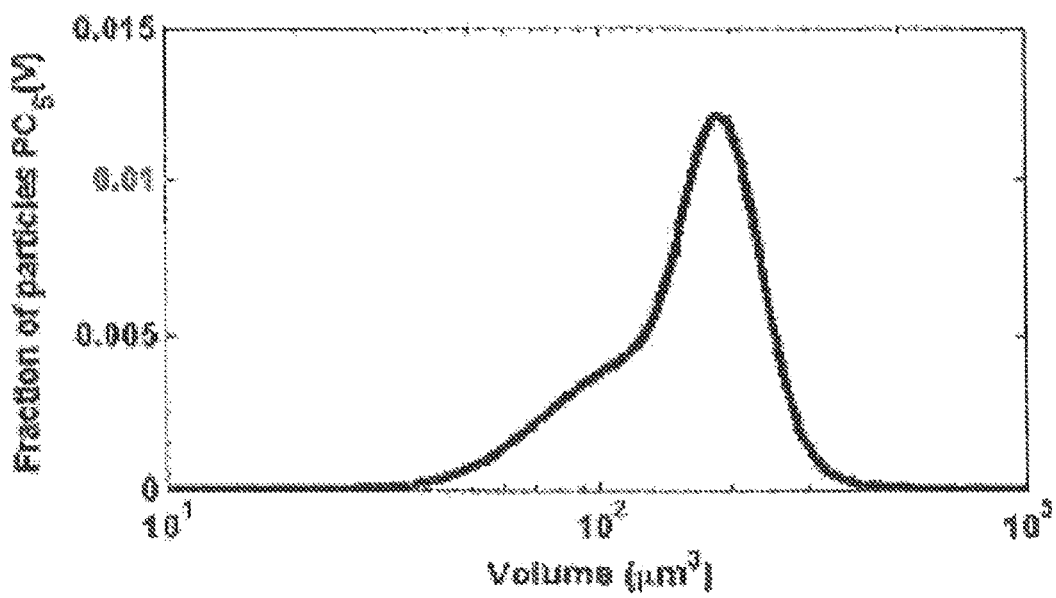
FIG. 5B shows an example combination passing curve of groupings of particles that have been combined as a single group.

The GCDEP can be applied provided any two or more individual groups of granular composites where fractions of each group, such that each fraction exhibits a passing curve that is representative of its group, are intended to be combined in certain ratios. Each group can consist of particles made from the same or different materials, and the shapes and physical characteristics of the particles in a group can be the same or different. Generally, individual groups of particles should exhibit only one local maximum of sufficient size in their passing curve, or a single volume range over which local maxima of roughly comparable size are present. When two or more local maxima are present in a grouping of particles, such that two or more sufficiently-sized particle groups can be distinguished in the fashion described in Characteristic 1 (see above) for some combination of volumes of particles from the sufficiently-sized groups, then the grouping should be segregated and considered as two or more groups such that the segregation criteria explained in Characteristic 1 are met. The groups can be physically divided according to these criteria as well. This concept is illustrated in FIG. 4. If not physically divided, then when mixing the undivided group with other groups, the undivided group must be considered as several sufficiently sized groups where the volume ratios of particles between sufficiently sized groups within the undivided group are fixed. Alternatively, in two or more groupings of particles, each of which cannot be divided into more than one sufficiently sized particle group, if the local maxima or range of volumes over which local maxima occur overlap such that no combination of volumes from the two groups can form two sufficiently sized groups, then these groups should be combined and considered as a single group. This concept is illustrated in FIG. 5. When considered and prepared in this way, the set of all individual particles groups shall be said to be consistent with the "GCDEP group criteria".

In this way, the GCDEP is distinct from other granular composite porosity (and sometimes also viscosity) reduction processes that consider the combined volume distribution of the entire granular composite, rather than mixing ratios of individual groups of particles. Methods that approach mixing from the perspective of combined volume distributions are common in many fields, including but not limited to high performance concrete mixture proportioning. For example, many of the methods discussed in academic literature, including, for example, in F. de Larrard, *Concrete mixture proportioning*, Routledge, New York (1999) and in J. M. Schilstone, *Concrete mixture optimization*, Concrete International, 33-40, June (1990), conclude that "gaps" placed in otherwise smooth volume distributions can increase porosity and relative viscosity, whereas the GCDEP is based in part upon the idea that optimizing mixture proportioning according to gap size decreases porosity and relative viscosity. In this and other statements, "relative viscosity" refers to the case where a granular composite consists of particles suspended in a fluid or other type of matrix material, where the relative viscosity is the viscosity of the particles and matrix at fixed ratio of particles to matrix divided by the viscosity of the matrix alone. Other approaches, including those discussed in M. N, Mangulkar and S. S. Jamkar, *Review of particle packing theories used for concrete mix proportioning*, International Journal Of Scientific & Engineering Research 4, 143-148 (2013); F. de Larrard, *Concrete optimization with regard to packing density and rheology*, 3rd RILEM international symposium on rheology of cement suspensions such as fresh concrete, France (2009); and in F. de Larrard, *Concrete mixture proportioning*, Routledge, New York (1999), sometimes consider distinct groups of particles, just as does the discrete large ratio approach. However, these approaches generally favor combinations of groups such that the resulting composite does not meet the maxima/minima size criteria discussed in Characteristic 1 (see above). When these composites are not favored, the assumption is made, as it is in M. Kolonko, S. Raschdorf, and D. Wasch, *A hierarchical approach to simulate the packing density of particle mixtures on a computer*, Granular Matter 12, 629-643 (2010), that smaller particles will fit within the voids of a mechanically stable structure formed by the larger particles, as is the case with the discrete large ratio approach. However, this assumption is inaccurate with large error in porosity estimates when average particle volumes of groups are in large to small ratios of less than 10,000, and often leads to mixed composites that easily phase separate.

Some approaches considering distinct groups attempt to correct for the inaccuracy in assuming that large particles will fit within the voids of a mechanically stable structure formed by the larger particles; however, these approaches 1) cannot accurately predict mixing ratios between groups that yield the smallest porosities, and 2) are not based on knowledge of the structures produced by the GCDEP and use instead, for example, inaccurate "virtual" structures, such as discussed in F. de Larrard, *Concrete optimization with regard to packing density and rheology*, 3rd RILEM international symposium on rheology of cement suspensions such as fresh concrete, France (2009); and in F. de Larrard, *Concrete mixture proportioning*, Routledge, New York (1999). These "correcting" approaches are fundamentally distinct from than the GCDEP, and they indicate different mixture proportioning than does the GCDEP. For example, the approaches most often indicate that to produce low-porosity structures, very large gaps must be present between particle groups, i.e., the ratio of large to small average particle volumes between groups will be large. When large to small average particle volumes are smaller than 10,000, these approaches favor combinations of particles such that the passing curve of the resulting composite do not meet the maxima/minima size criteria discussed in Characteristic 1 (see above).

Consequently, the predicted porosities and relative viscosities of the favored composites are much higher than could be achieved using the GCDEP. For example, the compressible packing model of de Larrard is known to overestimate the porosity of many granular composites including those consisting of two or more particle groups of roughly spherical particles, as noted in E. P. Koehler, D. W. Fowler, E. H. Foley, G. J. Rogers, S. Watanachet, and M. J. Jung, *Self-consolidating concrete for precast structural applications: mixture proportions, workability, and early-age hardened properties*, Center for Transportation Research, Project 0-5134-1 (2008).

This is also true of linear packing models and extensions of these models to non-spherical particles, as discussed in A. B. Yu, R. P. Zou, and N. Standish, *Modifying the linear packing model for predicting the porosity of nonspherical particle mixtures*, Ind. Eng. Chem. Res. 35, 3730-3741 (1996).

Using the GCDEP, as the examples in this document demonstrate, contrary to the conclusions of some others, "gaps" in combined volume distributions of granular composites lead to far lower porosities and relative viscosities than lack of gaps, when the size of the gaps and volume ratios of individual groups mixed to form those composites are chosen carefully. The examples also demonstrate that, using the GCDEP, porosity reductions and reductions in relative viscosity can be achieved, over a given range of particles sizes, that are greater than those that can be achieved by both: 1) approaches that make the assumption that smaller particles fall within the voids of a mechanically stable structure formed by the larger particles, and 2) approaches that attempt to correct the error introduced by the assumption that smaller particles fall within the voids of a mechanically stable structure formed by the larger particles. The GCDEP is able to accomplish these reductions via a novel approach designed to encourage the production of DSMG structures.

Particle volume probability density functions for the constituents of any granular composite can be easily experimentally determined in many different ways. One way is via standard sieving, which is useful for many types of particles generally ranging in size from the micron to centimeter scales. For smaller particles, distributions can be determined using scanning electron microscopes and image analysis techniques, or by using special small-particle sieves, or by desktop centrifuges. The sieve and centrifuge methods, along with others not described here, can also be used to separate particles, should separation (or combination) be required to meet the "GCDEP group criteria" described previously. The exact procedure used to determine volume distributions is not relevant to the GCDEP, except insofar as increased accuracy in the procedure can result in decreased porosity and relative viscosity when using the process.

Hereafter, we refer to a granular composite made by combining different amounts of particles from two different groups where the groups are consistent with the GCDEP group criteria as a "bimodal" composite, a composite made from three different groups consistent with the criteria as a "trimodal" composite, four sets as "quadramodal", etc. This concept is most usefully applied, in terms of decreasing the porosity of the granular composite comprising a combination of different amounts of particles from the individual groups, when there is little overlap between any two volume probability density functions (or passing curves) of individual groups of particles. However, the GCDEP can just as easily be applied when there is significant overlap between individual distributions, even though the result will generally be that the porosity of the combined set of particles is higher.

At its core, the GCDEP allows, provided a set comprising two or more particles groups conforming to the GCDEP group criteria, the combination of these groups, in specified relative ratios of volumes, so as to achieve low porosities and relative viscosities, including a method of calculating, within experimental accuracies, those porosities. In this usage as before, "relative viscosity" refers to the relative viscosity of a granular composite of particles including a matrix material filling the voids between constituents, where the ratio of constituents to matrix material is fixed.

However, the GCDEP can additionally be used, in conjunction with optimization methods, to select, from a set of three or more groups of particles that conforms to the GCDEP group criteria, the subset of groups of particles that minimizes or nearly-minimizes porosity and relative viscosity, given all possible combinations of subsets of groups from the set. This Section includes descriptions of the steps involved in the GCDEP and examples of the actual application of these steps to groups of particles. The following Section includes a description and examples of methods to select a subset of groups from a set of three or more particle groups so that, using the GCDEP, porosity for the set considering all subsets of groups of particles will be minimized or nearly-minimized.

C. Improving the Accuracy of the GCDEP

When creating a low-porosity granular composite, before employing the GCDEP, the available particulate materials that will comprise the granular composite can be identified. For example, in creating an ink to be used in a 3D printing process, it is generally known of what initial material the final printed part will be made. Examples include pure elements like Titanium, alloys such as stainless steel and Ti 6-4, cermets like Titanium Carbide or Gallium Nitride, and mixed-phase composites such as sand/aluminum. Once the details have been established concerning what materials are available, a plan can be developed for how to mix them. It is important to note that the GCDEP does not proscribe what materials be used, but only how, once chosen, in what approximate proportions they should be mixed to obtain reduced porosities and relative viscosities.

Certain knowledge is useful for the GCDEP. This knowledge includes the approximate volume probability density functions (or passing curves) of the chosen group or groups of particles, which is necessary so that groups of particles can be confirmed to conform to the GCDEP group criteria. Alternatively, as described previously, groups of particles can be separated or combined such that the final set of groups conforms to the GCDEP group criteria. For example, in cases of a particle group that exhibits a volume distribution spanning a large range of particle sizes, this group can be divided into two or more different groups by removing certain sizes of particles, such that each new particle group is separated from other groups by gaps and such that the groups in the new set conform to the GCDEP group criteria. It is important to note that when these steps are taken, the more accurate the volume distributions, the more accurate will be the GCDEP mixing ratios, and therefore the lower the possible porosity and relative viscosities that can be achieved.

When using lookup tables or algorithms to complete Step 1 of the GCDEP (discussed in more detail below) rather than direct experimentation, further information above and beyond volume distributions of the particle groups are required. This information includes details about particle geometry and frictional (or other, e.g., electrostatic, Van-der-Waals) interactions between particles, as well as how the particles will be mixed (e.g., loosely mixed under gravity or compacted, vibrated, shaken, etc.). For most known materials, this information can be found in the relevant literature, or approximations of this information can be calculated. Exact information is not necessary for the GCDEP to be applied, but more accurate information generally leads to reduced porosities and viscosities of the final granular composite developed using the GCDEP.

Figure 6:
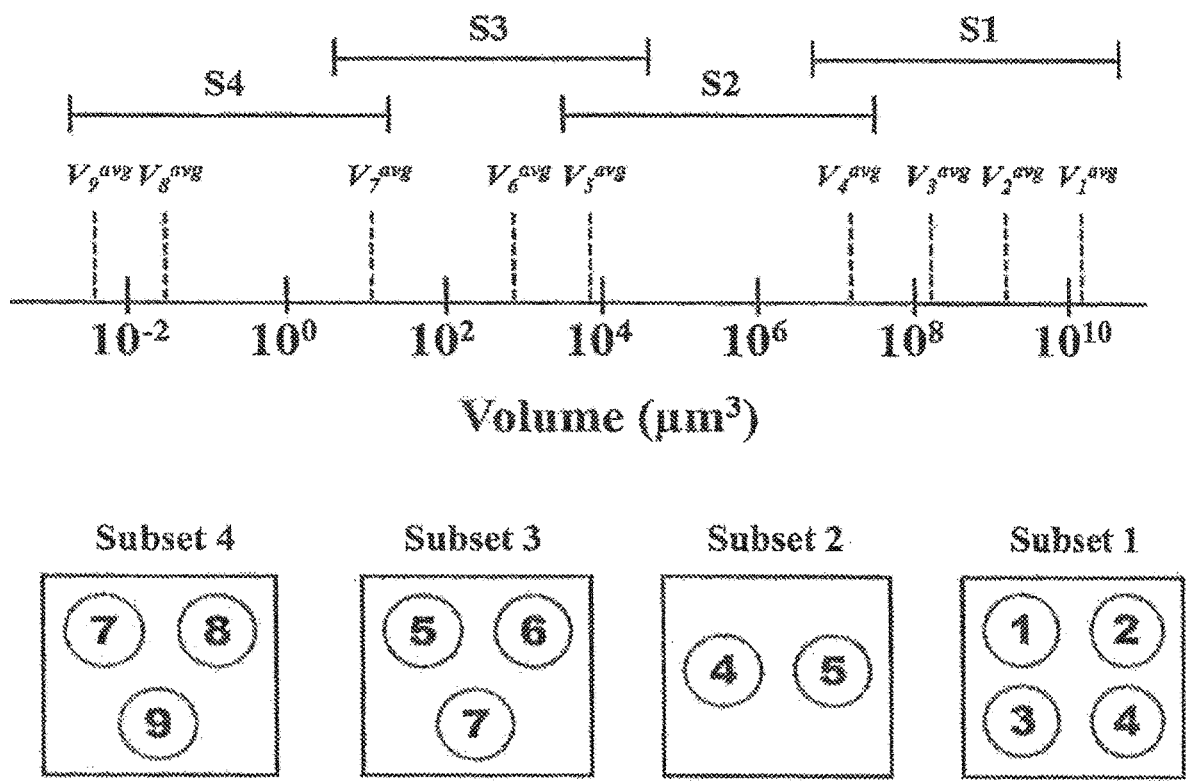
FIG. 6 is a schematic showing the separating of 9 particle groups j=1 ... 9 with group average particle volumes $V_j^{avg}$ into subsets according to volume ranges spanning four orders of magnitude (factor of 10,000). In this case, the super-set {i} of all subsets contains 4 subsets, $\{1,2,3,4\}_1$, $\{4,5\}_2$, $\{5,6,7\}_3$, and $\{7,8,9\}_4$.

For sets comprising three or more particle groups conforming to the GCDEP group criteria, before the GCDEP can be applied, the super-set of all subsets of the set of particle groups must be provided, according to the following definitions of subset and super-set. A subset $\{j\}_i$ consists of, over a range $[V_l, V_r]$ in volume such that $V_r/V_l=10,000$, all particle groups with group average particle volume included in the range $[V_l, V_r]$, where $\{j\}_i$ requires that it is the "largest" subset "i", i.e., such that there are no subsets with more particle groups than $\{j\}_i$ that also include all of the particle groups included in $\{j\}_i$. By this definition, a particle group can belong to more than one subset. The super-set $\{i\}$ of all subsets $\{j\}_i$ consists of all unique largest subsets of particle groups. This concept is illustrated in FIG. 6. Thus, for a set composed of three of more groups of particles, the present invention contemplates criteria for dividing the set of particle groups into subsets consistent with the GCDEP group criteria.

D. The GCDEP Steps

The GCDEP steps can be summarized for one embodiment as follows:

1. Determine the relative volumes in which the groups of particles within a subset will be combined so as to reduce porosity. This can be accomplished via use of computational simulation, experimentation, or lookup tables. Examples of all three cases are provided below.

2. Considering the information determined in Step 1 on subsets of particles (subset is defined explicitly in the previous section), calculate, according to a formula described here, the relative volumes in which the groups of particles within the entire set can be combined to reduce porosity, including the calculation of the approximate porosity achieved.

Importantly, Step 2 is not required when particle groups form only a single subset, and when subsets do not overlap in terms of particle groups. However, even with multiple subsets that overlap in terms of particle groups, rather than use the above-described Step 2 of the GCDEP, simulations, data tables, or experimentation can be undertaken (as in Step 1) to find minimal porosity structures.

Referring now to the steps in more detail, the first required step of the GCDEP process is to determine, for a set of particle groups conforming to the GCDEP group criteria, the relative volumes at which particle groups within each subset are mixed to minimize the porosity. This can be accomplished experimentally using a well-designed experiment, or via lookup tables or computer simulation, assuming that the volume distributions, rough particle shapes, and frictional interaction between particles are known. The use of one computer simulation to determine the minimal porosity of two particle groups where each group consists of a single size of frictionless spheres is described in the work of Hopkins, Stillinger, and Torquato (cited above). The computer simulation algorithm used in Hopkins, Stillinger and Torquato can also simulate three or more particles groups, and it can take into account non-spherical particles of any shape and frictional interaction, though including more particle groups and highly aspherical shapes increases computational time. The TJ algorithm is described in more detail in the Definitions section.

Using the volume probability density function of the particle groups, in some cases, it is possible to approximately calculate, with little error, the relative group volumes at which the minimum in porosity occurs using the discrete large ratio approach. This is the case, generally, 1) when the ratio of average particle volumes between groups of larger to smaller particles is at least 10,000, and 2) when, for mixtures of relative volumes of the groups that correspond to the minimum in porosity, the integral in the combined volume distribution of both groups, over the range of volume where each individual volume distribution is greater than about 3%, includes no more than about 10% of the total volume of both groups of particles. It is important to note that the numbers 3% and 10% in these "overlap integration guidelines" are not intended to be exact boundaries. Instead, the intent in this approximate description is to estimate, based on existing data, when two groups of particles can be treated using the discrete large ratio approach.

If the discrete large ratio approach can be employed, then the mixing of two groups of particles will not result in structures that clearly exhibit some or all of the distinct characteristics of DSMG structures described earlier. However, the possibility of phase separation will need to be considered, as phase separation occurs more often and more easily at greater ratios of average particle volumes. In the case of no phase separation, the total packing fraction $\varphi_t$ (equal to one minus porosity) in the discrete large ratio approach is easily calculated as, $\varphi_t = \varphi_L + (1-\varphi_L)*\varphi_S$, with $\varphi_L$ the packing fraction of the particle set including only larger volume particles and $\varphi_S$ the packing fraction of the particle set including only smaller volume particles. The relative volume of particles from the smaller set $x_S$ follows, as $x_S = ((1-\varphi_L)*\varphi_S)/\varphi_t$, and from the larger set as $x_L = 1 - x_S = \varphi_L/\varphi_t$.

Experimentation can also be used to find the relative volumes of particle groups within a subset at which the minimal porosity will occur, though for subsets comprising three or more particle groups, experimentation can be tedious and time consuming. Considering first only two groups of particles, one experimental procedure to determine relative volumes at which groups are mixed to obtain porosity minima will be described. It is important to note that the GCDEP does not require that this procedure be used; rather, any experimental procedure to determine porosity minima can be used. However, the extent of the porosity and relative viscosity reductions of the granular composite will depend on the accuracy of the procedure employed; for this reason, it is helpful to conduct the experiment very carefully in order to ensure accuracy.

In one such procedure, a container capable of very accurately measuring volumes and an accurate scale are required. For high accuracy, the container must measure in length and width (or diameter), and height at least 100 times the average longest linear extent of particles in the larger set of particles. Additionally, when measuring the volume of particles, enough particles must be placed in the container such that the measured height of the fill is at least 100 times the average longest linear extent of particles in the larger group. This is due to the effects of the boundary walls on the composite, as smaller particles will accumulate in large numbers in the spaces against the walls in which the large particles cannot be placed, and larger particles can accumulate on top of the composite.

For example, consider the set of two particle groups, the larger with elongated particles and average volume 125 times that of the smaller, and both with standard deviations of less than 10% of their mean volume. If the ratio of volumes at which these sets are mixed to obtain minimal porosity is 25% smaller, 75% larger in a cylindrical container with diameter and height 1000 times that of the largest linear extent of the largest particles in the composite, then if a container is used with a diameter of only 10 times the largest linear extent of the largest particles in the composite, the minimal porosity will be increased and the mixing ratios found to produce this porosity will be approximately 70% larger particles, 30% smaller particles. This rough approximation is based on the assumption that near a boundary wall, within one half the length of the average largest extent of the larger particles, the composite will contain by volume 50% particles from the larger set, 50% particles from the smaller set. In reality, this is a very coarse approximation, as the actual effect of the boundary, due to spatial correlations between particles in mechanically stable granular composites, has a substantial effect significantly farther from the boundary than one half the length of the average largest extent of the larger particles. Additionally, smaller and larger particle shape, frictional interactions between particles, and frictional interactions between particles and the boundaries will also play a role in boundary effects, as well as the method in which particles are placed in the container. The best way to reduce the relative effect of the boundaries is therefore to increase the relative volume to surface ratio of the container, by making the container larger and filling it with more volume of particles.

Once the containers have been selected, the zero-porosity average densities of the individual particles in each set (the density calculated by excluding void space from volume in the density denominator) should be obtained. There are numerous ways to accomplish this, particularly if the particle materials are known and their properties can be looked up in the literature. The method whereby the densities are determined is not important to the GCDEP, but large errors in density will result in larger porosities and relative viscosities when particle groups are mixed.

Using density data, the porosity of each individual particle group should be determined. This can be accomplished in many ways, including but not limited to by placing the container on the scale, taking account of its mass, then filling the container with particles from a single group to a height at least 100 times the average longest linear extent of the particles in that group. The difference in mass between the container with particles and the container without particles, divided by the volume of the particles in the container, divided by the average density of individual particles in the group, is the packing fraction (equal to one minus the porosity). This measurement should be repeated many times and the results averaged to obtain higher statistical accuracy.

When performing volume and mass measurements using the scale and container, great care must be taken to prepare each composite structure in approximately the same fashion as the previous. This fashion should reflect the final application in which the granular composite is expected to be used, because composite preparation can strongly affect porosity. For example, if in the final application the granular composite will be compacted, then the preparation should include a compaction step. If in the final application the granular composite will be placed in a solvent, then a solvent should be added (and appropriate calculations to reflect the mass of this solvent taken into account).

This approach should be repeated, except now considering mixtures of the two particle groups. Again, care should be taken such that the mixing of the two particle groups reflects the mixing that will occur in the final application of the composite. One can start with only particles from the larger group, then mix in increasing mass of particles from the smaller group, or start with particles from the smaller group and mix in increasing mass of particles from the larger group. The volume fraction of the granular composite should be calculated after each step of adding a small amount of mass of particles to the mixture and remixing in the initial mixing fashion. Smaller increments of mass will result in a more accurate determination of the ratio at which maximum density occurs. In this case, the volume fraction is equal to the sum of the zero-porosity volumes of the particles from each group according to their masses in the container, divided by the volume of the mixed composite in the container. For each group of particles, the zero-porosity volumes are calculated as the mass of the particles in the container divided by the zero-porosity average densities of the particles in that group. This entire experiment should be repeated many times and the results averaged in order to obtain higher statistical accuracy.

Plotting the curve of packing fractions as a function of the relative volume of particles from either the smaller or larger particle group yields a distinct maximum (where relative volume at each point is calculated as the zero-porosity volume of the particles from a single group according to its mass in the container divided by the sum of zero-porosity volumes of both groups according to their masses in the containers). The granular composites at and around this maximum will have structures exhibiting some or all of the characteristics of DSMG structures, as described above. Generally, mixtures with up to about 10% less absolute relative small particle group volume fraction than the maximum, and about 30-50% greater absolute relative small particle group volume fraction from the maximum, will exhibit some or all of the DSMG structural characteristics. The exact distance in units of absolute relative small particle group volume fraction less than or greater than the maximum at which these features are detectable depends on the size and shape of particles, on volume distributions, on mixing methods, and on frictional interactions between particles.

If more than two groups of particles are to be considered, the experimental procedure just described can be performed using combinations of particles from three or more groups. This will take significantly more time, but one trained in the art can reduce this time by focusing on relative volume fractions, informed by the experiments on pairs of particle groups, that appear most likely to yield local maxima in density. In the case of three or more groups, more than one local maxima in density can occur; identifying the largest of these maxima will enable larger reductions in overall composite porosity and relative viscosity.

Once the relative volumes that yield porosity minima for all subsets is determined, the relative volume ratios in which sets should be combined to yield DSMG structures of low porosity and relative viscosity can be determined to good approximation using a simple technique. This technique is the second step of the GCDEP, though it is NOT a mandatory step, as division into subsets is not strictly necessary; this step simply allows a quick and fairly accurate approximation in order to save time. When there is only a single subset of particle groups, this second step is entirely unnecessary, and when there is no overlap between subsets, i.e., no two subsets contain the same particle group, then this second step is mathematically trivial (though still very accurate).

In this technique, the following notation will be used: the super-set of all subsets is $\{i\}$, where the particle group with the largest average particle volume belongs to set i=1, and where of all remaining subsets (excluding particle groups belonging only to set 1), the subset with the particle group having the largest average particle volume is set i=2, and so on. The subset of all particle groups included in each set "i" is $\{j\}_i$, where the "j" are the particle groups such that the largest group is j=1, the next largest j=2, and so on. So if subset 2 includes the second, third, and fourth largest groups of particles, then $\{2,3,4\}_2$ is the notation for this set. The fraction of space occupied by each particle group in a subset, as found from Step 1 of the GCDEP via mixing experiments, simulation, lookup tables, or other means, is $\varphi_{i,j}$, and, along with the void space, each subset "i" of particles obeys: $1 = \Sigma_{i,j} \varphi_{i,j} + \varphi_{i,v}$, with $\varphi_{i,v}$ the fraction of space occupied by voids and the summation running over all "j" in subset $\{j\}_i$. It is important to note that the $\varphi_{i,j}$ employed in the second step of the GCDEP need not be the $\varphi_{i,j}$ that occur at the minimum in porosity for mixing of the subset "i". However, for the technique to be accurate, the $\varphi_{i,j}$ used for each subset "i" must fall on the actual mixing curve (or surface) as determined in Step 1 of the GCDEP. As previously discussed, DSMG structures can be formed for a range of $\varphi_{i,j}$ values away from the $\varphi_{i,j}$ values that yield the minimum in porosity, and the second step of the GCDEP generally accommodates this range of values.

A qualitative overview of the technique is as follows. When considering the combination of a pair of subsets with overlap between particle groups, some particle groups will "interact" because they are close enough in size, while the particles from the smallest particle groups in the smaller subset will behave as if the particles from the largest particle groups in the larger subset are merely the boundaries of a confined space, i.e., these groups are "non-interacting". With this in mind, there are volumes of free space, bounded by the largest particle groups, that are available to be filled only by the particles from the smallest particle groups. In the notation following, these volumes end in subscript index "1", i.e., for subscripts $\{a_i\}$ and subset "i", these volumes are denoted $V\{a_1, a_2, \ldots, a_{(i-2)}, a_{(i-1)}, 1\}$.

Figure 8:
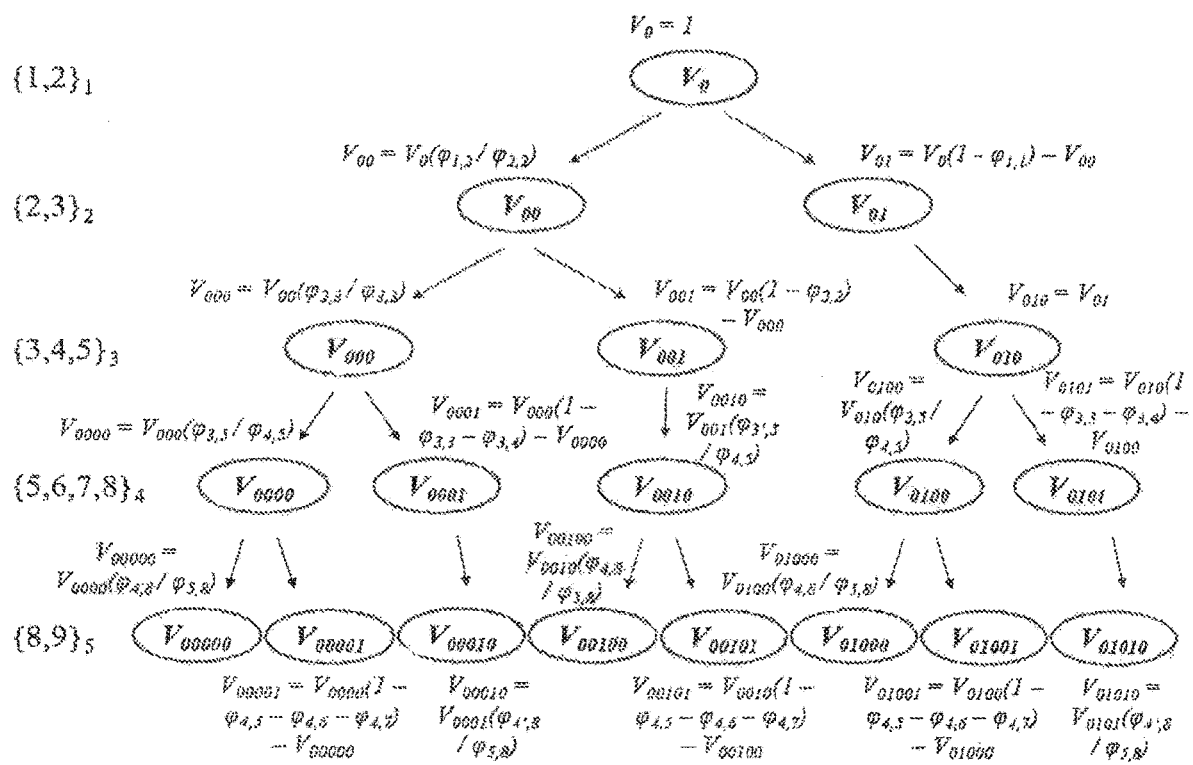
FIG. 8 is a diagram showing an example calculation of the volumes used in calculating the approximate mixing volume fractions $\varphi_j$ used to reduce porosity when particle groups from different subsets are mixed. The example given is for subsets that contain one overlapping particle group with each adjacent subset.

The number of volume spaces in each subset associated with terms in calculations of particle group final volume fraction follows a Fibonacci sequence. The first subset calculations require only one volume, labeled $V_0$ ($V_0$ should be equal to the volume of the space to be packed, which in volume fraction terms is written $V_0 = 1$). The second subset requires two volumes, $V_{00}$ and $V_{01}$, the third subset three volumes, the fourth five volumes, the fifth eight volumes, and so on according to the Fibonacci sequence. In binary subscript notation, the number of subscripts indicates the subset number "i"; the term "0" indicates the volume available (and occupied) by all of the particle groups in subset "i", and the term "1" indicates the volume available to only the smallest particle groups in subset "i", i.e., the groups that belong to subset "i" and not to "i−1". Additionally, a subscript label "1" cannot be adjacent to another subscript "1", as the volume available only to the smallest particles in a subset cannot contain, for the next subset "i+1", "additional" volume available only to the smallest particles in the "i+1" subset. Following these rules in writing subscripts means that the number of volume terms in subset "i" corresponds to the "i+1" Fibonacci number. For example, the fourth subset contains the 5 volumes $V_{000}$, $V_{0100}$, $V_{0010}$, $V_{0101}$, and $V_{0001}$, and "5" is the fifth Fibonacci number. FIG. 8 is an illustration of the calculation of these volumes for subsets $\{1,2\}_1$, $\{2,3\}_2$, $\{3,4,5\}_3$, $\{5,6,7,8\}_4$, and $\{8,9\}_5$.

For this technique, the porosities of single particle groups (without mixing) $P_j$ are sometimes required. Additionally, in certain cases for certain subsets containing three or more particle groups, information concerning mixtures of particle groups excluding the larger group or larger groups from that subset can be required. This requirement is described in Step 3 below. In the following described technique, the quantities $\varphi_j$ represent the volume fraction of total space that the particles from a given particle group will occupy in the final composite mixture. This technique tends to be slightly more accurate when each successive pair of subsets shares either no particle groups or only a single particle group between them. Consequently, these cases will be discussed first, and the case where any two subsets share multiple particle groups described subsequently as a special case.

The technique is as follows:

1) Starting with the first subset i=1, set the $\varphi_j$ for all "j" in subset 1 equal to $\varphi_{1,j}$.

2) When particle groups are shared between subsets, calculate all volumes $V\{a_n\}$ for the next subset, i.e., $V_{00}$ and $V_{01}$ for the second subset i=2.

a. For any volume with last two subscripts "$a_{(i-1)}$, $a_i$" ending in "0,0", $V\{a_1, a_2, \ldots a_{(i-2)}, 0, 0\} = V(a_1, a_2, \ldots a_{(i-2)}, 0)*(\varphi_{(i-1),j}/\varphi_{i,j})$, where "j" here refers to the particle group that is shared by both subsets "i" and "i-1". For example, if i=4 for adjacent subsets $\{4,5,6\}_3$ and $\{6,7,8,9\}_4$, then $V_{0000} = V_{000}*(\varphi_{3,6}/\varphi_{4,6})$, and $V_{0100} = V_{010}*(\varphi_{3,6}/\varphi_{4,6})$. If $V\{a_1, a_2, \ldots a_{(i-2)}, 0, 0\}$ is greater than $V(a_1, a_2, \ldots a_{(i-2)}, 0)$, then calculate $V'(a_1, a_2, \ldots a_{(i-2)}, 0, 0) = V(a_1, a_2, \ldots a_{(i-2)}, 0)$ and calculate $V'\{a_1, a_2, \ldots a_{(i-2)}, 0\} = V'(a_1, a_2, \ldots a_{(i-2)}, 0, 0)/V\{a_1, a_2, \ldots a_{(i-2)}, 0, 0\}$. Use $V'\{a_1, a_2, \ldots a_{(i-2)}, 0\}$ and $V'\{a_1, a_2, \ldots a_{(i-2)}, 0, 0\}$ in place of $V(a_1, a_2, \ldots a_{(i-2)}, 0)$ and $V\{a_1, a_2, \ldots a_{(i-2)}, 0, 0\}$, respectively, in all subsequent calculations, and recalculate any other volumes requiring $V(a_1, a_2, \ldots a_{(i-2)}, 0)$, using $V'(a_1, a_2, \ldots a_{(i-2)}, 0)$ in its place.

b. For any volume with last two subscripts "$a_{(i-1)}$, $a_i$" ending in "1,0", $V(a_1, a_2, \ldots a_{(i-2)}, 1, 0) = V\{a_1, a_2, \ldots a_{(i-2)}, 1\}$, assuming there are no particle groups belonging only to subset "i-1". If there are, then the fractions of space occupied by a minimal porosity mixture of all particle groups that belong to subset "i-1" but NOT to subset "i" must be known. These fractions are written $\varphi_{i',j}$, and are used to calculate $V(a_1, a_2, \ldots a_{(i-2)}, 1, 0)$ as $V\{a_1, a_2, \ldots a_{(i-2)}, 1, 0\} = V(a_1, a_2, \ldots a_{(i-2)}, 1\}*(\varphi_{(i-1)',j}/\varphi_{i,j})$ where "j" refers to the particle group shared by both subsets "i" and "i-1". For example, for "i=4" and subsets $\{2,3,4\}_2$, $\{4,5,6\}_3$, and $\{6,7,8,9\}_4$, $V_{0010} = V_{001}*(\varphi_{3',6}/\varphi_{4,6})$, where $\varphi_{3',6}$ represents the volume fraction of particle group 6 that minimizes the porosity of a mixture of particle groups 5 and 6.

c. For any volume with last two subscripts "$a_{(i-1)}$, $a_i$" ending in "0,1", $V\{a_1, \ldots, a_{(i-2)}, 0, 1\} = V\{a_1, \ldots, a_{(i-2)}, 0\}*(1-\Sigma\varphi_{(i-1),j}) - V(a_1, \ldots, a_{(i-2)}, 0, 0)$, where the summation over $\varphi_{(i-1),j}$ includes all $\varphi_{(i-1),j}$ such that particle group "j" belongs to subset "i-1" but not to subset "i". For example, if i=4 for subsets $\{2,3,4\}_2$, $\{4,5,6\}_3$, and $\{6,7,8, 9\}_4$, then $V_{0101} = V_{010}*(1-\varphi_{3,4}-\varphi_{3,5}) - V_{0100}$.

3) For any negative volumes $V(a_1, a_2, \ldots, a_{(i-1)}, 1)$, adjustments must be made to the $\varphi_{i,j}$ found in the first step of the GCDEP. Two options are possible: the first generally results in slightly lower overall porosities than the second, and the second generally in relatively reduced phase separation.

a. Reduce $\varphi_{(i-1),(j=x)}$ to $\varphi'_{(i-1),(j=x)}$, where $\varphi'_{(i-1),(j=x)}$ is defined as the value such that the smallest volume $V\{a_1, a_2, \ldots, a_{(i-1)}, 1\}$ of subset "i" is zero, and where particle group "j=x" belongs to both subsets "i" and "i-1". Using $\varphi'_{(i-1),j}$ in place of the $\varphi_{(i-1),j}$, recalculate all volumes $V\{a_n\}$ for subset "i", and proceed using the $\varphi'_{(i-1),j}$ in place of the $\varphi_{(i-1),j}$ for all future calculations.

b. For the calculations of volumes in subset "i", but NOT for other volume calculations, reduce proportionally all $\varphi_{(i-1),j}$ to $\varphi'_{(i-1),j}$, where the $\varphi'_{(i-1),j}$ are defined as the values such that the smallest volume $V\{a_1, a_2, \ldots, a_{(i-1),j}\}$ is zero, and where the particle groups "j" are all groups that belong to subset "i-1" but NOT to subset "i". Using the $\varphi'_{(i-1),j}$ in place of the $\varphi_{(i-1),j}$, recalculate all volumes $V\{a_n\}$ for subset "i". If this step is taken, when calculating $\varphi_i$ for subsets "i-1" and "i-2", the reduced $\varphi'_{(i-1),j}$ must be used.

4) Repeat steps 2) and 3) until volumes for all subsets have been calculated.

5) Calculate the $\varphi_j$ for each particle group "j" using the volumes $V\{a_n\}$. In the following formulae, it is assumed that the $\varphi'_{i,j}$ discussed in Step 3 are substituted for the $\varphi_{i,j}$ where indicated. For each subset "i" beginning with "i=1", for the particle groups "j" that do not belong to any "i" smaller than the subset "i" considered, a. For particle groups in subsets "i" such that there are no particle groups belonging only to subset "i", $\varphi_j = \varphi_{i,j}*\Sigma V\{a_1, a_2, \ldots, a_{(i-1)}, 0\} + \varphi_{(i+1),j}*\Sigma V\{a_1, a_2, \ldots, a_{(i-1)}, 1\}$, where the first sum is over all $V\{a_1, a_2, \ldots, a_{(i-1)}, a_i\}$ for "i" that do NOT end in subscript "1" and the second is over all $V\{a_1, a_2, \ldots, a_{(i-1)}, a_i\}$ that end in the subscript "1". If there are no subsets with index greater than "i", then the value $(1-P_j)$ is substituted for $\varphi_{(i+1),j}$ in the second term of the equation. For example, for i=4 and subsets $\{2,3,4\}_2$, $\{4,5,6\}_3$, $\{6,7\}_4$, $\{7,8,9\}_5$, $\varphi_7 = \varphi_{4,7}*(V_{0000}+V_{0100}+V_{0010}) + \varphi_{5,7}*(V_{0001}+V_{0101})$. If in the previous example subset 5 were not to be mixed, then $\varphi_7 = \varphi_{4,7}*(V_{0000}+V_{0100}+V_{0010}) + (1-P_7)*(V_{0001}+V_{0101})$.

b. For particle groups in subsets "i" where there are particle groups "j" that belong only to subset "i", $\varphi_j = \varphi_{i,j}*\Sigma V\{a_1, a_2, \ldots, a_{(i-1)}, 0\} + \varphi_{i',j}*\Sigma V\{a_1, a_2, \ldots, a_{(i-1)}, 1\}$, where the $\varphi_{i',j}$ are the same as those calculated in Step 2b), i.e., the fractions of space occupied by a minimal porosity mixture of all particle groups that belong to subset "i-1" but NOT to subset "i". For example, for i=4 and subsets $\{2,3,4\}_2$, $\{4,5,6\}_3$, and $\{6,7,8,9\}_4$, $\varphi_7$, $\varphi_8$, and $\varphi_9$ are calculated as, $\varphi_7 = \varphi_{4,7}*(V_{0000}+V_{0100}+V_{0010}) + \varphi_{4',7}*(V_{0001}+V_{0101})$, $\varphi_8 = \varphi_{4,8}*(V_{0000}+V_{0100}+V_{0010}) + \varphi_{4',8}*(V_{0001}+V_{0101})$, and $\varphi_9 = \varphi_{4,9}*(V_{0000}+V_{0100}+V_{0010}) + \varphi_{4',9}*(V_{0001}+V_{0101})$.

6) When no particle groups are shared between subsets, the super set of all subsets can be subdivided into sets of subsets within which each subset shares particle groups with at least one other particle group in the set. For example, $\{1,2\}_1$, $\{2,3\}_2$, $\{4,5,6\}_3$, $\{6,7\}_4$, $\{8\}_5$, can be divided into three sets, $\{1,2\}_1$, $\{2,3\}_2$; $\{4,5,6\}_1$, $\{6,7\}_2$; and $\{8\}_1$, each with its own set of volumes for each subset "i", $(V1)\{a_n\}$, $(V2)\{a_n\}$, $(V3)\{a_n\}$, calculated in the manner described in steps 1) through 6) above. The only difference is that while $(V1)_0 = 1$, $(V2)_0$ is set equal to one minus the total porosity of the particle groups belonging to set 1, $(V3)_0$ is set equal to one minus the total porosity of the particle groups belonging to sets 1 and 2, etc. Using the previous example, $(V2)_0 = 1-\varphi 1-\varphi 2-\varphi 3$, and $(V3)_0 = 1-\varphi 1-\varphi 2-\varphi 3-\varphi 4-\varphi 5-\varphi 6-\varphi 7 = V2_0 - \varphi 4-\varphi 5-\varphi 6-\varphi 7$.

When more than two particle groups overlap between subsets, a modification to Steps 2a and 2b of the above 6-step technique is necessary. The modification is straightforward; when calculating volumes for subset "i", instead of multiplying by $(\varphi_{(i-1),j}/\varphi_{i,j})$ (Step 2a) or $(\varphi_{(i-1)',j}/\varphi_{i,j})$ (Step 2b), a general reduction factor taking into account all overlapping group volume fractions $\varphi_{i,j}$ and $\varphi_{(i-1),j}$ must be used. For example, for groups j1, j2 overlapping between subsets "i" and "i−1", an average of the volume fractions of the overlapping groups, $(\varphi_{(i-1),j1}+\varphi_{(i-1),j2})/(\varphi_{i,j1}+\varphi_{i,j2})$ (Step 2a) or $(\varphi_{(i-1)',j1}+\varphi_{(i-)',j2})/(\varphi_{i,j1}+\varphi_{i,j2})$ (Step 2b), can be employed in place of the original factor $(\varphi_{(i-1),j}/\varphi_{i,j})$ (Step 2a) or $(\varphi_{(i-1)',j}/\varphi_{i,j})$ (Step 2b), respectively. The average can extend to three or more overlapping groups as well. Alternatively, if the large to small average volume fraction of two overlapping groups is large, for example, greater than 1,000, then the fact that they both overlap can be ignored, and, for the purposes of the volume calculation, it can be assumed that the group with larger average particle size does not belong to subset "i". For example, given groups $\{1,2,3\}_1$ and $\{2,3,4\}_2$, the factor $(\varphi_{1,3}/\varphi_{2,3})$ can be used to calculate $V_{00}$. Ignoring the overlap in this case will result in a small decrease in accuracy in the final calculated porosity.

For all other Steps in the 6-step technique described above, any language applying to a single overlapping group can be extended to apply to all overlapping groups. For example, if using an average of volume fractions to calculate the reduction factor, then in Step 2c for i=4 and subsets $\{3,4\}_2$, $\{4,5,6\}_3$, and $\{5,6,7\}_4$, $V_{0101}=V_{010}*(1-\varphi_{3,4})-V_{0100}$ rather than $V_{0101}=V_{010}*(1-\varphi_{3,4}-\varphi_{3,5})-V_{0100}$, as groups 5 and 6 belong both to subset 3 and subset 4. However, if assuming that only group 6 overlaps, then $V_{0101}=V_{010}*(1-\varphi_{3,4}-\varphi_{3,5})-V_{0100}$, as before.

E. Methods for Choosing Particle Groups to Minimize Porosity

In many practical circumstances, available materials in particle form can be divided into a large number of groups, or there are a large number of available groups of particles from which a composite can be formed. For example, in concrete manufacture, there are often as many as 10-50 different types of aggregate conveniently located in quarries or other aggregate production facilities near a job site. Or, in additive manufacturing, powder materials of a certain molecular composition can be made (or ordered) to meet specific average particle volume and standard deviation criteria. Generally, when many groups of particles with average volumes within a small ratio range are available, for example, 10 groups available with largest to smallest average volume ratio of 1,000,000, using all possible groups to compose a granular composite will not yield the lowest porosity. In these cases, it is important to choose the right groups in order to achieve low porosities.

Some "rule of thumb" criteria for choosing particle groups include a) choose adjacent groups with large to small average particle volume ratios greater than 25 but less than 2,000, b) where possible, choose groups with smaller relative standard deviations (e.g., groups with arithmetic standard deviations less than 30% of average particle volume, particularly when the large to small average particle volume ratios of adjacent particle groups are small), and c) choose groups with higher average sphericity, and when mixing methods will not include compaction or vibration steps, with smaller group coefficient of static friction.

The first criteria (a) reflects a balance between reducing porosity and reducing tendency to phase separate. When mixing different particle groups, both porosity and the tendency to phase separate are strongly dependent on a variety of factors. However, adjacent particle groups with smaller large to small average particle volume ratios tend to phase separate far less easily, but form less dense structures, while particle groups with larger large to small average volume ratios tend to phase separate more easily but form denser structures when not separated. The second criteria (b) reflects the difference between continuous particle distributions and adjacent sufficiently sized particle groups; if particle groups are not distinct as described by the GCDEP group criteria, these groups tend to pack less densely when mixed. The third criteria (c) reflects a general guideline for mixing multiple groups of particles: groups of highly angular, apspherical particles require both larger large to small average particle volume ratios and particularly careful preparation to mix into composites with reduced porosities; it is more simple to achieve low porosities when using spherical particles with low coefficients of static friction.

Balancing granular composite porosity with other desired physical characteristics, including but not limited to relative viscosity and tendency to phase separate, requires substantial knowledge of particle groups' physical characteristics, physical interactions, size distributions, particle geometry, method of mixing, and potentially other factors as well. However, given substantial knowledge of some or all of these critical factors, the choice of which particle groups to mix in order to achieve desired results (including, for example, finding the minimal porosity structure that won't phase separate under certain applications given a fixer upper limit on relative viscosity) can be made by considering particle group mixing as an optimization problem.

Provided a superset of particle groups that conform to the GCDEP group criteria, the first step of the GCDEP process can be used in conjunction with optimization methods to minimize the porosity of a granular composite composed of a subset of the particle groups. This approach is aided by the division of the superset of particle groups into subsets, an example of which is illustrated in FIG. 6, and by knowledge of the porosities of the subsets, mixed as they will be mixed for the application of the granular composite, as a function of relative volumes of each group in the mixture. For a given subset "i" containing $N_i$ particle groups "j", these porosities can be written as $P_i(\varphi_{i,j1}, \varphi_{i,j2} \ldots \varphi_{i,jN})$ for volume fractions $\varphi_{i,jn}$.

Given these porosity functions $P_i(\varphi_{i,j1}, \varphi_{i,j2} \ldots \varphi_{i,jN})$, the problem of choosing groups becomes a nonlinear programming problem in a number of variables equal to $\Sigma_i(N_i-1)$, where the sum is over all subsets "i" and the "minus 1" term is due to the fact that given the porosity $P_i$ and "$N_i-1$" of $\varphi_{i,jn}$, the last of the $\varphi_{i,jn}$ can be determined. Those familiar in the art can construct the objective function of the programming problem using the 6-step approximation technique described above or any other accurate subset combination technique that is devised. Standard constraints can be included in the problem, for example, $\varphi_{i,jn}>=0$, or to reduce phase separation, any $\varphi_{i,jn}$ can be set so that it is greater than, by any amount, the $\varphi_{i,jn}$ corresponding to the minimum in porosity. Constraints can also be set to incorporate Step 3 of the 6-step approximation technique. Any accurate programming technique, including but not limited to Augmented Lagrangian, Quasi-Newton, Barrier, Conjugate Gradient, etc., can be used on its own or in conjunction with other methods to obtain reduced porosity solutions. In using these methods, for large numbers of particle groups, it is likely that many of the volume fractions $\varphi_{i,jn}$ will be zero whenever j=jn, indicating that group "j" is not included in the final composite. This non-zero volume fractions $\varphi_{i,jn}$ indicate the groups that should be included in the final composite.

Partial knowledge of $P_i(\varphi_{i,j1}, \varphi_{i,j2} \ldots \varphi_{i,jN})$ over the range of interest in the $\varphi_{i,jn}$ for each subset often requires time-consuming methods to obtain. However, this knowledge is not generally necessary for the optimization method. Rather, it is more practical when the number of particle groups in a subset "i" is large to obtain partial subset porosity functions $P_{j1,j2}(\varphi_{i,j1}, \varphi_{i,j2})$ for the mixtures of pairs of particle groups where the large to small average volume ratio of the pair is less than 10,000, and the functions $P_{j1,j2,j3}(\varphi_{i,j1}, \varphi_{i,j2}, \varphi_{i,j3})$ for mixtures of triplets of particle groups where the large to small average volume ratio of the pair is less than 10,000. Groups of four, five, six, etc. particle groups under the same average volume ratio criteria can also be employed. However, given particularly large supersets of particle groups, the "rule of thumb" criteria previously mentioned can be used to reduce the number of required porosity functions.

Given the partial subset porosity functions $P_{j1,j2}, \ldots (\varphi_{i,j1}, \varphi_{i,j2} \ldots)$ and the subset segregation procedure, an example of which is given in FIG. 6, those skilled in the art can construct an objective function for a programming problem using the 6-step approximation technique described earlier. Constraints can be added in the same fashion as when using the full $P_i(\varphi_{i,j1}, \varphi_{i,j2} \ldots \varphi_{i,jN})$ functions. Additionally, this approach requires using in the objective function groups of particles corresponding only to sets of the $P_{j1,j2}, \ldots (\varphi_{i,j1}, \varphi_{i,j2} \ldots)$ such that each $P_{j1,j2}, \ldots (\varphi_{i,j1}, \varphi_{i,j2} \ldots)$ forms a subset via the subset segregation procedure illustrated in FIG. 6. Consequently, it may be necessary to consider and/or solve several different programming problems, each with objective function and constraints corresponding to different sets of $P_{j1,j2}, \ldots (\varphi_{i,j1}, \varphi_{i,j2} \ldots)$. However, these programming problems will be significantly more time-efficient to solve given the reduction in variables in each problem due to the simpler forms of the $P_{j1,j2}, \ldots (\varphi_{i,j1}, \varphi_{i,j2} \ldots)$.

Finally, the complete or partial porosity functions $P_i(\varphi_{i,j1}, \varphi_{i,j2} \ldots \varphi_{i,jN})$ and $P_{j1,j2}, \ldots (\varphi_{i,j1}, \varphi_{i,j2} \ldots)$ are not necessary in order to choose, from a large superset of groups, which groups to mix to achieve a granular composite with substantially reduced porosity. Given a single point from each porosity function $P_i(\varphi_{i,j1}, \varphi_{i,j2} \ldots \varphi_{i,jN})$, or a single point from each of a set of chosen $P_{j1,j2}, \ldots (\varphi_{i,j1}, \varphi_{i,j2} \ldots)$, where each of the set of $P_{j1,j2}, \ldots (\varphi_{i,j1}, \varphi_{i,j2} \ldots)$ forms a subset via the subset segregation procedure illustrated in FIG. 6, the 6-step procedure described in Subsection B of the previous Section can be used to obtain a reduced porosity mixture. In particular, if the points that are given are at the minima in porosity or near to the minima in porosity of the porosity functions, the 6-step technique described in Subsection B of the previous section will yield a substantially reduced-porosity mixture.

DESCRIPTION OF PREFERRED EMBODIMENTS

As noted above, in one embodiment, the present invention contemplates additive manufacturing, including but not limited to Selective laser sintering (SLS). SLS is a technique used for the production of prototype models and functional components. SLS uses lasers as its power source to sinter powdered material, binding it together to create a solid structure. The aim of the laser beam is scanned over a layer of powder and the beam is switched on to sinter the powder or a portion of the powder. Powder is applied and successive layers sintered until a completed part is formed. The powder can comprise plastic, metal, ceramic, carbide, glass, and polymer substances (as well as combinations thereof).

Selective Laser Sintering and Direct Metal Laser Sintering are essentially the same thing, with SLS used to refer to the process as applied to a variety of materials-plastics, glass, ceramics-whereas DMLS often refers to the process as applied to metal alloys. But what sets sintering apart from melting or "Cusing" is that the sintering processes do not fully melt the powder, but heats it to the point that the powder can fuse together on a molecular level.

Selective Laser Melting, or SLM (often called Direct Metal Laser Metaling, or DMLM), on the other hand, uses the laser to achieve a full melt. In this case, the powder is not merely fused together, but is actually melted into a homogenous part. Melting is typically useful for a monomaterial (pure titanium or a single alloy such as Ti 6-4), as there's just one melting point. By contrast, it is currently typical when working with multiple metals, alloys, or combinations of alloys and other materials such as plastics, ceramics, polymers, carbides or glasses, to use SLS or DMLS.

The present invention contemplates using increase porosity powders with SLS and DMLS. In addition, such powders are herein contemplated for SLM and DMLM.

Generally, in the field of additive manufacturing using composites such as powders, little work has been done with respect to optimizing the structures of the composites. It is not known, even among experts in the field, that composites with greatly reduced porosity can be produced, where those composites do not easily phase separate and are still malleable enough to be used in standard applications. Metal and ceramic powders employed in selective laser melting and selective laser sintering processes generally exhibit porosities of about 30% to 50%. In the scarce academic literature available on the subject of the effect of powder porosity on laser sintering and laser melting processes, powders with porosities of as low as 25% have been produced. E. O. Olakamni, K. W. Dalgarno, and R. F. Cochrane, *Laser sintering of blended Al—Si powders*, Rapid Prototyping Journal 18, 109-119 (2012). The reasons for this small body of work involving lower porosity powders include, but are not limited to, that a) the extent of the advantages of using powders with porosities less than about 25% are not known, and b) a low-cost production process that produces powders that do not easily phase separate, maintain the malleability to be processed easily (i.e., have low enough viscosity), and exhibit porosities less than about 25%, is not known.

As a general process improvement to additive manufacturing processes using metal, ceramic, cermet, glass, carbide, or other high-melting temperature powders along with focused melting by laser or other process, the use and advantages of employing low-porosity powders, defined as powders with porosities less than or equal to 20%, are described. These low-porosity powders can be produced by either the granular composite density enhancement process or by some other process (this distinction is discussed in detail below). The use of low-porosity powders can be undertaken with powder particles composed of metals, cermets, ceramics, glasses, polymers, and alloys of any elemental or molecular composition. In particular, the threshold value of 20% porosity is set for low porosity powders to reflect the upper bound of the porosities of powders used and capable of being used in current additive manufacturing processes.

Additive manufacturing as an industry and the research community have at times recognized some benefits to decreasing the porosity of powders. This is evident in the sometimes-employed "compaction step" undertaken using rollers or vibrating hoppers in the laser melting and laser sintering processes to decrease porosity of powders from about 35-50% to about 25-35% before melting or sintering using laser energy. However, in the few cases where it has been investigated, decreasing porosity beyond these amounts is often not seen as desirable. For example, one of the few studies that includes data on some of the effects of reducing powder porosity in a laser sintering process on laser sintered parts, states that "Results from [other] studies have not been able to completely define what direct consequences the nature of particle packing arrangements has on the processing conditions, densification, and microstructure of laser sintered components." See E. O. Olakanmi et al. (cited above). Olakanmi et al studied metal powders ranging in porosity from roughly 28% to 37%. Though some of their lower-porosity powders produce greater density printed parts, which is desirable, in other cases, they found "no strong correlation" between the density of printed parts and the porosity of the powders. They concluded that it is not clear whether decreasing porosity beyond the experimental parameters of their work can be beneficial to the laser sintering process.

In direct contrast to these conclusions, the present inventors have identified a broad range of advantages to the laser melting and laser sintering processes due to employing low-porosity powders. A discussion of these advantages follows.

Reductions in porosity increase overall absorption of laser energy in powders, particularly as powder layers become thinner and thinner, for example, for layers less than 100 μm thick. The increase in absorption means that more laser energy is used for melting particles, rather than energy being scattered into the atmosphere of the printer chamber, making printing with low-porosity powders more efficient. As laser melting and laser sintering processes require expensive high-power lasers, the ability to reduce required laser power can result in significant cost savings in the laser component of printers. For example, in a laser melting process, comparing the absorption of a standard Titanium-based alloy powder of about 40% porosity with skin depth of about 65 μm to a low-porosity Titanium-based alloy powder of about 10% porosity with skin depth of about 20 μm, the low-porosity powder will absorb approximately 2.5× as much laser energy, thereby allowing the use of a laser that outputs 60% less power.

Reductions in porosity also decrease lateral scattering of laser energy in laser heating of powders, meaning that heating is more focused. This leads to a more uniform, more controlled melting or sintering process.

Reductions in porosity exponentially increase the thermal conductivity of powders. This is due in part to the increased number of conduction pathways present in lower-porosity powders, which have more contacts between particles. The increase in thermal conductivity from a 40% porosity powder to a 5% porosity powder can be as much as 10× to 50×, and this change can result in a multitude of improvements for laser melting and laser sintering processes.

One improvement resulting from this increase in thermal conductivity is a greatly reduced temperature gradient present over the powder layer as it heats, melts, and re-solidifies. This reduced gradient can be as large or larger than 250,000 degrees Kelvin per centimeter. A larger temperature gradient means more thermal expansion in some areas of the liquid, and therefore more volume change from liquid to solid, leading to uneven re-solidification in the sense of more grains and grain boundaries (including cracks) in the metal solids. Powders with increased thermal conductivity therefore can re-solidify with fewer grain boundaries and cracks. This leads to greater strength of the solid and greater durability under stressed, high temperature, and corrosion conditions, as well as improved part surface structure due to more even heat flow and therefore melting.

The reduced temperature gradient induced by higher powder thermal conductivity also extends into the metal material below the powder. This means that more of the previously printed layers will be heated to a greater temperature when the powder has relatively higher thermal conductivity, which means more annealing of the metal, leading to a reduction in grain boundaries and a generally more uniform finished-part microstructure. This also leads to a reduced tendency of the liquid metal to "ball" on the surface, which is undesirable as balling leads to pore formation in the final printed solid, because interface energies are reduced under lower temperature gradients across the interface.

A relatively higher powder thermal conductivity also leads to relatively lower maximum temperatures exhibited during a laser melting or laser sintering process. The difference in maximum temperature can exceed 1000 degrees Kelvin, where the highest temperatures occur at the powder surface (which liquefies and sometimes boils). Relatively higher maximum temperatures mean more oxidation, which is undesirable due to oxidation-induced balling and to the introduction of oxide impurities. Relatively higher maximum temperatures also mean more "splatter" of the surface liquid, resulting in a rougher surface and possibly micro or macro pore formation. Pore formation leads to weaker, less durable, less corrosion-resistant solid parts. Relatively higher maximum temperatures additionally mean, in alloys, more phase separation, for example, of Carbon migrating to the surface in liquid stainless steel. Phase separation is undesirable, as it leads to weaker structure and even delamination of layers.

Reductions in porosity also decrease the amount of superheated gas present in the spaces between particles in a powder structure. This is important, as that gas must escape during the melting and re-solidification process. Gas escape during solidification can lead to micro and macro pore formation, as well as grain boundary formation.

Due to the advantages including but not limited to those discussed previously, and due to both the inconclusive nature of past studies investigating the effects of employing relatively denser powders in additive manufacturing processes involving powders and to the previous inability in general practice of producing workable (meaning low enough viscosity and minimal phase separation) powders with porosities of 20% or less, the present inventors propose, as a general process improvement to additive manufacturing processes where composite layers are sintered or melted in succession to form final products, the use of powders exhibiting porosities of 20% or less. A method, the granular composite density enhancement process, to produce such powders from a range of different materials including but not limited to pure metals, alloys, ceramics, cermets, and glasses, is described above. Specific examples of how to produce workable powders with porosities of 20% or less using the granular composite density enhancement process are given in the Experimental section. Examples of how to produce workable powders with porosities of 20% or less using other processes are also found in the Experimental section.

Employing a powdered metal ink for a Direct Metal Laser Sintering (DMLS) or Selective Laser Melting (SLM) process, print speed can be dramatically enhanced using an ink produced according to the granular composite density enhancement process described herein. It is useful to compare (by way of example) an "enhanced ink" to a standard metal powder consisting of approximately same-size, roughly spherical particles. Assuming that the melt time of the ink is the limiting factor in print speed, a minimum 50-100 times increase in print speed is expected due to the increased thermal conductivity and lower porosity of the enhanced ink. These calculations assume a neutral background gas of Ni or Ar at approximately 1 atmosphere-of pressure and are valid for various metal, ceramic, carbide, and other inks including Ti, Ti alloys, Stainless Steel, Copper, Nickel-based superalloys, Aluminum Oxide, Tungsten Carbide, and any other material with bulk thermal conductivity greater than 1 W/m*K. At lower pressures and for materials with higher bulk thermal conductivities, the increase is more pronounced. The increase in print speed is accompanied by significant increases in the bulk, shear and Young's moduli (i.e., increased mechanical strength), and in electrical and thermal conductivity. Additionally, significant improvement in the reproducibility of high-quality printed products, due to reduced void fraction and defects, is expected in the resultant printed product.

When we compare (by way of example) an "enhanced ink" to a metal powder consisting of a mixture of two sizes of roughly spherical particles, the larger particles are assumed to be roughly 100 times larger than the smaller, by volume. Assuming that the melt time of the ink is the limiting factor in print speed, a 5-25 times increase in print speed is expected due to the increased thermal conductivity and lower porosity of the enhanced ink. These calculations assume a neutral background gas of $N_2$ or Ar at approximately 1 atmosphere of pressure and are valid for various metal inks including Ti, Ti alloys, Stainless Steel, Copper, and any other metallic element or alloy with bulk thermal conductivity greater than 1 W/m*K. At lower pressures and for metals with higher bulk thermal conductivities, the increase is more pronounced. The increase in print speed is accompanied by significant increases in the bulk, shear and Young's moduli (i.e., increased mechanical strength), and in electrical and thermal conductivity. Additionally, significant improvement in the reproducibility of high-quality printed products, due to reduced void fraction and defects, is expected in the resultant printed product. The increases in mechanical strength, conductivities, and reproducibility are expected to be somewhat less extreme than those obtained when comparing to a generic powder ink.

In describing the enhanced ink, the most important point to remember is that different microstructures, even at similar porosities (porosity is interchangeable with density when a single alloy or element is specified), can result in different characteristics, including viscosities, conductivities (related to print speed), and mechanical strengths.

EXPERIMENTAL

Example 1

This is an example of the production of a dense powder for additive manufacturing purposes without using the GCDEP. Ti 6-4 (Ti-6Al-4V, or titanium containing (by weight) about 6% aluminum, 4% vanadium, and some minimal trace elements, including but not limited to iron and oxygen). In this example, two groups of Ti 6-4 particles of commercial purity with a large difference in averages particle sizes are used to produce a compacted metal powder with porosity of approximately 18%. The first group of particles exhibit approximately normally distributed volumes with average particle volume of about 8,000 µm3 (effective diameter of about 25 µm) and a small diameter standard deviation of 5 µm. The volumes of the second group are approximately log-normally distributed according to effective diameters (meaning an approximately normally distributed passing curve, and also volume probability density function, as a function of the logarithm of particle effective diameter or logarithm of particle volume), with an average particle volume of 0.5 µm3 (effective diameter of about 1 µm), and a diameter standard deviation of 0.5 µm. Both groups of particles are highly-spherical (sphericity>0.95), and the coefficient of frictional interaction between particles within the same group is about 0.28, indicating the presence of a thin (<5 nm thick) natural oxide layer surrounding the particles. The un-compacted packing fraction (fraction of space covered by the particles) of the first group is 0.60, and that of the second group is 0.595, consistent with the sphericity and coefficients of friction of the groups. When thoroughly mixed without vibration in larger group to smaller group mass fractions of 71%: 29%, porosity of the bulk material will be approximately 18%. Exact porosity is highly dependent on mixing method, as these particles will have a tendency to phase separate, for example, when vibrated. The phase separated mixture will exhibit a porosity of about 40%. To achieve 18% porosity, thorough up-down mixing with minimal vibration and a compaction step are necessary. For example, in additive manufacturing, if a 100 µm layer of the mixed power is deposited using a roller, this roller can pass a second time over the deposited layer except at a slightly lower height, thereby compacting the mixture. In this case, the surface of the layer will exhibit higher porosity than the bulk, but only to ~10-20 µm of depth.

Example 2

This is an example of the production of a dense powder for additive manufacturing purposes without using the GCDEP. 316 Stainless Steel (approximately 16.5% carbon, 12% chromium, 3% nickel, 1.4% molybdenum, 0.8% silicon, and trace phosphorus, sulfur, other elements). In this example, stainless steel particles of commercial purity in a single group exhibiting a continuous, approximately log-normally distributed size (diameter) probability density function with average particle effective diameter of about 50 nm (effective volume of 65,000 nm3), sphericity of 0.86, and frictional coefficient of 0.52, are used to produce a powder with porosity of about 20%. To accomplish this, the geometric standard deviation of the particle group must be about 5.5 m, meaning that 5% of the total volume of particles will be greater than 1 mm in diameter (and 40% greater than 100 µm in diameter). In this case, for additive manufacturing, a vibration step will be advantageous in reducing porosity, as phase separation will not likely be a concern. However, laser processing of layers 1 mm thick is complicated, as even particle melting (with minimal evaporation) is inhibited by the amount of time required for the bottom of the layer, 1 mm from the point where the laser first strikes the surface, to heat to melting temperatures. Additionally, the smaller nanometer-scale particles, having a much higher ratio of surface area to volume, are more subject to forces, including but not limited to electrostatic, Casimir and Van der Waals forces, that cause them to "stick" to each other and larger particles. To counter electrostatic forces, an environment with minimal residual charge (a "static-free" environment) is important, and an additional compaction step likely necessary, to achieve 20% porosity.

Example 3

Figure 7A:
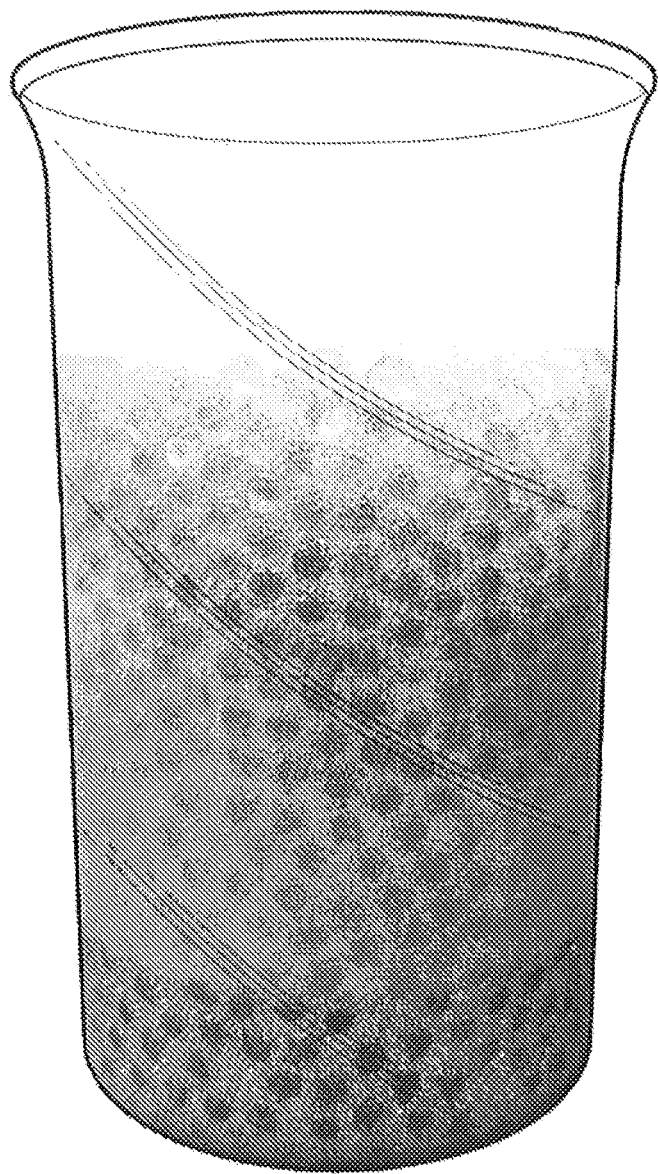
FIG. 7 provides a side image (FIG. 7A) and top image (FIG. 7B) of a mixture of about 17% relative volume fraction of 2 mm diameter soda-lime beads with about 83% relative volume fraction of 10 mm diameter soda-lime beads, with porosity of 21.2%. The beads have sphericity of >0.98 and coefficient of static friction<0.05, and hence simulate frictionless spheres well.
Figure 7B:
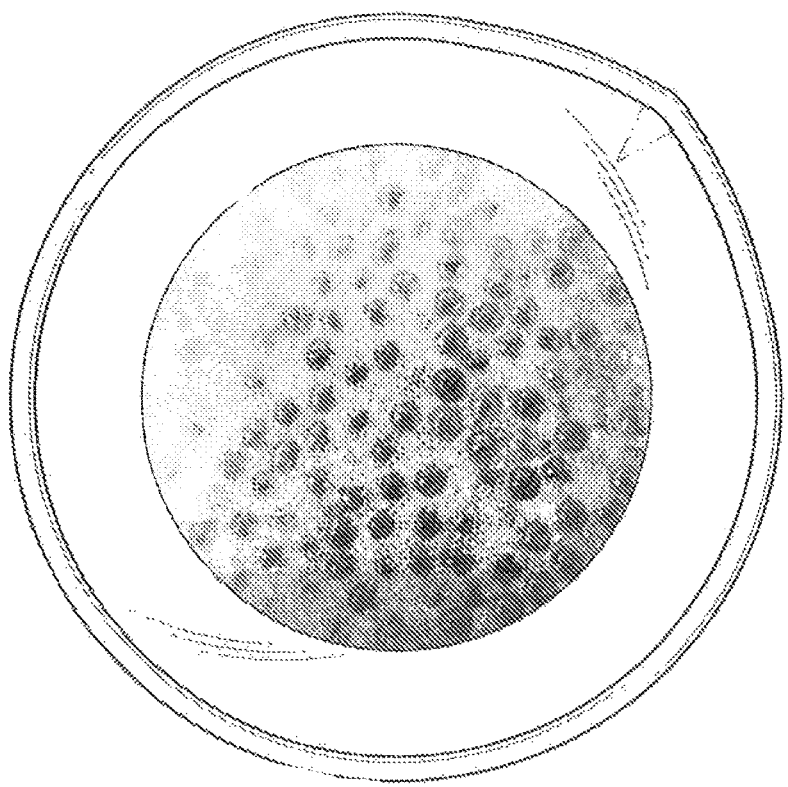

This is an example of the production of a dense granular composite using the GCDEP. Two groups of flint glass (also called soda-lime) beads with high sphericity>0.98 and low static coefficient of friction<0.05 are to be mixed to form a macroscopic filter. The larger group of beads are 10 mm in diameter and the smaller are 2 mm in diameter. The bead mixtures are highly uniform, i.e., the standard deviation of the volume probability density function of each group is approximately zero. Referring to Table 1, a catalogue of various critical porosity values for simulated mixtures of frictionless spheres at various small to large average sphere diameter (and volume) ratios (simulations conducted using the TJ algorithm), the minimum porosity of 21.6% is found to occur at a relative volume fraction of small spheres of 20.6%. No compaction or vibration step is necessary to achieve this porosity; in fact, excess vibration will result in phase separation of the beads at these size ratios. Upon mixing, the minimum in porosity was found to be 21.4%, occurring within 0.9% of the simulated value, at a relative volume fraction of small spheres of 20.1%, within 2.4% of the simulated value. The slightly lower porosity found at somewhat smaller small sphere relative volume fraction was likely the result of some ordering of the larger spheres occurring during the mixing. FIG. 7 contains images displaying the experimental apparati of these tests. The beaker in the images contains a mixture of a relative volume fractions of about 17.5% 2 mm beads and 82.5% 10 mm beads with porosity of 22.2%. This image is not captured at the minimum porosity structure found for this diameter ratio of beads.

For mixtures of 1 mm and 10 mm beads exhibiting the same physical characteristics as the beads above, a minimum porosity of 17.7% was found at 25.0% relative volume fraction of small beads; this is within 0.6% of the minimum porosity as predicted by the simulations, with the minimum occurring within 0.4% of the critical relative small sphere volume fraction (data shown in Table 1).

For mixtures of 1 mm and 3 mm beads exhibiting the same physical characteristics as the beads above, a minimum porosity of 28.8% was found at relative small sphere volume fraction of 24.5%, which is within 0.7% of the porosity and the minimum within 0.4% of the relative small sphere volume fraction predicted by simulations (data shown in Table 1).

Example 4

This is an example of the production of a dense granular composite using the GCDEP. Two groups of highly spherical (sphericity>0.95), very low friction (static coefficient of friction equal to 0.07, kinetic coefficient of 0.03) Tungsten Disulfide particles are to be mixed to minimize porosity. The first group exhibits a normal distribution of diameters about a mean size of 10.1 μm with a standard deviation of 0.9 μm, and the second, also normally distributed, a mean size of 1.4 μm with a standard deviation of 0.14 μm. As the coefficients of friction are very low, the sphericity very near 1, and the standard deviations as a percentage of mean particle size very small, these particle groups can be considered as frictionless spheres. Referring to Table 1, the mixture that minimizes porosity is determined to occur at a relative volume fraction of 22.4% smaller particles, with a porosity of 18.7%. These values are determined by linear extrapolation to a diameter ratio of 1.4/10.1=0.137 from the values given in the table for small to large diameter ratios of 0.10 and 0.15. Due to low coefficients of friction, vibrating or compacting is not necessary to achieve low porosities, but to negate any electrostatic forces arising in the mixing procedure without inducing phase separation, a compaction step could sometimes be necessary.

Example 5

This is an example of the production of a dense granular composite using the GCDEP. Three groups of highly aspherical, high coefficient of friction particles, consisting of crushed rock and sand, are mixed with a paste, consisting of cement water, to make concrete. In this example, the amount of cement required to formulate the concrete is minimized such that the concrete is still "workable", meaning that it will still flow and, after compacting, fill spaces around rebar such that no macroscopic voids remain. The largest group of particles consists of highly elongated crushed granite with average roundness of 0.21, density 2.79 g/cm$^3$, average sphericity of 0.56, and coefficient of static friction of 0.92. The particles have been sieved between 4.00 mm and 4.18 mm sieves to yield a number average size of 4.09 mm with a roughly uniform size distribution from 4.00 mm to 4.18 mm. The porosity of this group of particles (on its own) is P1=52%. The second group of particles consists of natural sand of average roundness 0.54, density 2.66 g/cm3, average sphericity of 0.76, and coefficient of static friction of 0.70. The particles have been sieved between 1.00 mm and 1.25 mm sieves to yield a number average size of 1.13 mm with a roughly uniform size distribution from 1.00 mm to 1.25 mm. The third group, also natural sand, exhibits similar characteristics to the second, except it has been sieved through 0.15 mm and 0.20 mm sieves, yielding a roughly uniform particle distribution from 0.15 mm to 0.20 mm with average size of 0.18 mm. The second group exhibits a porosity (on its own) of $P_2$=45%, and the third group $P_3$=44%. The fourth group of particles consists of Portland grey cement; it exhibits an average roundness of 0.78, density of 3.15 g/cm$^3$, average sphericity of 0.88, and coefficient of static friction of 0.38. Its volume probability density function is roughly log-normally distributed around an average particle volume of 33,500 μm$^3$ (effective linear size (diameter) of 40 μm) with arithmetic standard deviation of about 97,500 μm$^3$ (57 μm in units of linear size), meaning that 97% of the volume of cement particles have a linear size smaller than 150 μm (69% smaller than 75 μm). The porosity of the cement (on its own) is 30%. However, since the size distribution and average particle volume of the cement will change (particles will become smaller) when the cement reacts chemically with water, the size distribution and average particle volume are in this case ignored. This is possible given the reaction with water, but were the smallest sand particles more similar in size to the cement particles, the cement average particle volume and size distribution could not necessarily be discounted.

Dividing the three groups of particles into subsets using the method depicted in FIG. 6 yields two subsets of particle groups, $\{1,2\}_1$ and $\{2,3\}_2$. In this case, for each subset, the relative volume fraction of smaller group particles at which minimal porosity occurs is determined experimentally using the experimental method described in Subsection B above. As previously stated, no vibration or compaction steps were taken in measuring volume fractions. For subset 1, minimal porosity is 44% and occurs at a relative volume fraction of group 2 particles of 40%. For subset 2, minimal porosity is 26% and occurs at a relative volume fraction of group 3 particles of 24%. Using the second step of the GCDEP, described in Subsection B above, the volume fraction of group 1 particles is found to be $\varphi_1$=0.56*0.60=0.336, and the volume fraction of group 2 particles is found to be $\varphi_2=0.56*0.40=0.224$. The quantity $V_{00}=0.398$ and $V_{01}=0.266$, yielding $\varphi_3=V_{00}*\varphi_{2,3}+V_{01}*(1-P_3)=0.220$. The volume fraction of group 3 particles is found to be $(1-0.364-0.358)*0.56=0.156$. The porosity of the aggregate mixture is 22.2%.

To this mixture of three groups of aggregates is added a paste of cement in water. There must be at least enough paste to fill the porosity between aggregates; however, generally, more paste is added in order to allow the wet concrete mixture to flow. Cement and water are usually combined in a pre-determined mass ratio, since the properties of the cement paste depends on the amount of water mixed in. However, extra water must be added to account for the water absorption of the aggregates. Each group 1, 2, and 3 of aggregates absorb, respectively, 1.1%, 1.5%, and 1.6% of their masses in water. In this case, cement was added in a mass fraction of 11.9% of the total mixture mass, with 0.45 grams of water added for every 1 gram of cement, and an additional 0.09 grams of water per gram of cement to account for aggregate absorption. If the cement and water were assumed to maintain their densities upon mixing (i.e., the chemical reactions were ignored), then the mass fraction of cement required (with water added in a mass fraction of water: cement, 0.54:1) to fill the porosity in the aggregate would have been 10.0%. However, with the improved viscosity afforded by adding extra cement, the final mass fractions of components were 36.1%: 23.0%: 22.5%: 11.9%: 6.5% group 1: group 2: group 3: cement: water. This represents a total of 74.6% aggregate, 9.4% cement, and 16.0% water by volume.

Example 6

This is an example of the production of a dense granular composite using the GCDEP. Three groups of particles, the first two structural materials consisting of spherical cast tungsten carbide (WC) powder, and the third a binding material consisting of cobalt (Co) powder, are mixed to form a composite powder for selective laser sintering. The WC particles are highly spherical (average sphericity>0.97) and exhibit low static coefficient of friction of 0.08 due to the addition of small amounts of lubricant, which will burn off at low temperatures (<500 degrees C.) during sintering. The first group of particles has uniform size distribution from 111 m to 118 µm, with average particle volume of 114 µm. The second group also has uniform size distribution, from 20 µm to 26 µm, with average particle volume of 23 µm. Considering the high sphericity and low coefficients of friction in the first two particle groups, these groups can be approximated as frictionless spheres. The Cobalt particles are rounded and somewhat aspherical, with sphericity of 0.84 and coefficient of static friction of 0.37. Their volumes are roughly log-normally distributed about an average of 0.4 µm3 (effective diameter of 0.9 µm) with arithmetic standard deviation of 0.25 µm3 (effective diameter standard deviation of about 0.78 µm). The Cobalt particles exhibit an uncompacted porosity of 31%. Dividing the three groups into subsets via the method illustrated in FIG. 6 yields two subsets $\{1,2\}_1$ and $\{3\}_2$, where the third group is small enough to be assumed to fit in the void space left by the two larger groups.

In this case, the thickness of powder layers to be sintered at each step in the additive manufacturing process is 250 µm-350 µm. To minimize variations in layer surface thickness, minimal porosity is not sought in mixing the first two sets of particles, but rather a mixture that includes 35% (by volume) 23 µm particles, thereby diluting the larger particles and reducing lateral surface thickness variation. Referring to Table 2, a catalogue of porosity values at different small sphere relative volume fractions for simulated mixtures of frictionless spheres at various small to large average sphere diameter ratios, the uncompacted porosity of the 65% group 1, 35% group 2 mixture is determined to be 24%. In an ideal fabrication process, the melted Cobalt would percolate and completely fill the void space within the WC mixture. At an uncompacted Cobalt powder porosity of 31%, this would require volume ratios of 0.65:0.35:0.35 group 1: group 2: group 3 particles. Written in mass fractions, this is 55%: 30%: 15% group 1: group 2: group 3 particles. Due to the small average particle size of Cobalt particles relative to the group 2 WC particles, a compaction step might be necessary before sintering in order to minimize phase separation of the Cobalt from the WC particles.

It should be noted that in most fabrication processes, in part due to the different densities of liquid and solid Cobalt, the material produced after laser sintering would be porous, and could therefore require less mass of Cobalt than used in this example.

Example 7

This is an example of the production of a dense granular composite using the GCDEP. Four groups of Ti 6-4 particles, each comprising about 89.5% titanium, 6% aluminum, 4% vanadium, 0.3% Iron and 0.2% Oxygen, as well as trace elements, are to be mixed to form a powder for a laser melting additive manufacturing process. The first group of particles exhibits average sphericity of 0.97, a coefficient of static friction of 0.25, and is distributed roughly uniformly in particle volume from 240 µm³ to 380 µm³ (7.7 µm to 9.0 µm in effective diameter) with average particle volume of 302 µm³ (8.3 µm in effective diameter). The second group exhibits similar average sphericity and coefficient of static friction, and is distributed uniformly in particle volume from 2.5 µm³ to 7.1 µm³ (1.7 µm to 2.4 µm in effective diameter) with average particle volume of 4.8 µm³. The third particle group exhibits average sphericity of 0.91, a coefficient of static friction of 0.37, and is distributed log-normally in its volume probability density function with average particle volume of 0.075 µm³ (effective diameter of 525 nm) and standard deviation of about 0.015 µm³. The fourth particle group exhibits average sphericity of 0.87, a coefficient of static friction of 0.42, and is distributed log-normally in its volume probability density function with average particle volume of 0.000697 µm³ (effective diameter of 110 nm) and standard deviation of about 0.000290 µm³. Dividing the four groups into subsets via the method illustrated in FIG. 6 yields two subsets, $\{1,2,3\}i$ and $\{3,4\}_2$.

With the size distributions, sphericities and coefficients of static friction known, simulations using the TJ algorithm yield a porosity minima and the relative volume fractions at which they occur for the subsets. Since the composite will be compacted before processing, compaction is also taken into account in the simulation, which yields for the first subset a porosity of 12.3% at relative volume fractions of 65.8%: 19.7%: 14.5%, and for the second subset a porosity of 23.4% occurring at relative volume fraction of 22.3% group 4 particles, where the group 4 particles on their own exhibit a porosity P4=38.8%. The second step of the GCDEP, as discussed in Subsection B above, is applied to yield $V_{00}=0.213$ and $V_{01}=0.0437$, and with $\varphi_1=0.578$, $\varphi_2=0.172$, and $\varphi_3=0.127$, yields $\varphi_4=V_{00}*\varphi_{2,4}+V_{01}*(1-P_4)=0.0589$. This gives a final porosity of 6.4% with relative volume fractions of 61.7%: 18.4%: 13.6%: 6.3% group 1: group 2: group 3: group 4 particles.

Example 8

This is an example of the production of a dense granular composite using the GCDEP. Seven groups of alumina ($Al_2O_3$) powders of high purity (>99.0%) are to be mixed, compressed at high pressure (200 MPa), and solid-state sintered at 1550 degrees C. for use as granular armor. The particle groups have the following properties:

1. The first group consists of cylinders (sphericity of about 0.87) 12.2 mm in length and 8.6 mm diameter, with roughly uniformly distributed volumes from 680 to 740 $mm^3$ (average volume of 710 $mm^3$). Their coefficient of friction is 0.34.

2. The second group consists of angular, aspherical particles (sphericity of 0.72) with roughly uniformly distributed volumes from 19.5 mm3 to 22.0 $mm^3$ (average volume of 21.8 $mm^3$, effective average diameter of 3.4 mm). Their coefficient of friction is 0.74.

3. The third group consists of angular, aspherical particles (sphericity of 0.75) with roughly uniformly distributed volumes from 0.55 mm3 to 0.9 $mm^3$ (average volume of 0.73 mm3, effective average diameter of 1.1 mm). Their coefficient of friction is 0.59.

4. The fourth group consists of highly spherical particles (sphericity of 0.98) with normally distributed volumes averaging 0.0016 mm3 and standard deviation of 0.0004 $mm^3$ (effective average diameter of 145 µm). Their coefficient of friction is 0.17.

5. The fifth group consists of highly spherical particles (sphericity of 0.97) with roughly uniformly distributed volumes from 5100 $µm^3$ to 6050 $µm^3$ (average volume of 5580 $µm^3$, effective average diameter of 22.0 µm). Their coefficient of friction is 0.21.

6. The sixth group consists of rounded, somewhat aspherical particles (sphericity of 0.88) with log-normally distributed volumes averaging 69 $m^3$ with a standard deviation of 5.2 $µm^3$ (effective average diameter of 5.1 µm). Their coefficient of friction is 0.38.

7. The seventh group consists of somewhat rounded, apspherical particles (sphericity of 0.84) with log-normally distributed volumes averaging 0.27 $µm^3$ with a standard deviation of 0.05 $m^3$ (effective average diameter of 0.8 µm). Their coefficient of friction is 0.47.

Dividing the seven particle groups into subsets via the method illustrated in FIG. 6 yields five subsets, $\{1,2,3\}_1$, $\{3,4\}_2$, $\{4,5\}_3$, $\{5,6\}_4$, and $\{6,7\}_5$. For each subset, to ensure that during compression there are no large voids, the relative volume of smaller spheres is chosen to be about 20% larger than the volume that corresponds to the minimum in porosity. Simulation using the TJ algorithm is used to determine the desired relative volumes for the first subset, yielding a minimum compacted porosity of 14.5%; however, for the volume fractions employed, compacted porosity is 16.9% at relative volumes of 46.4%: 25.9%: 27.3% group 1: group 2: group 3 particles. For the second subset, experimentation is used to determine a curve of porosity versus group 4 relative volume fraction of particles. The result is a compacted porosity minimum of 18.8% occurring at 28% group 4 particles; however, for the mixture of subsets, 33.5% group 4 particles are used, giving a porosity of 19.7%. For the third subset, under compaction, both particle groups of particles can be approximated as frictionless spheres. Using the lookup Table 2 at small to large diameter ratio of 0.15 yields, via linear interpolation, a porosity of 19.9% at 27% relative volume fraction of group 5 particles. For the fourth and fifth subsets, simulation using the TJ algorithm is employed, again using values for relative volume fractions of smaller particles that are about 20% larger than the values for which the porosity minimum occurs. This approaches yields porosities of 25.5% and 21.8% occurring at relative volume fractions of smaller particles of 29.5% and 25.2%, respectively. The compacted porosity $P_7$ of particle group 7 on its own was simulated to be 34.2%. Experiment placed $P_7$ at 33.9%, which was the value used.

Using the six-step method described herein, the subsets are combined. The following values are calculated:

1. $V_0=1$, $\varphi_1=0.386$, $\varphi_2=0.215$, $\varphi_3=0.227$

2. $V_{00}=0.425$, $V_{01}=-0.0261$. According to Step 3b) of the subset combination technique, $\varphi_1$ is reduced to 0.369 and $\varphi_2$ to 0.206, yielding $V_{01}=0$. The value $\varphi_5=0.114$.

3. $V_{000}=0.195$, $V_{001}=0.0026$, $V_{010}=0$. The value $\varphi_5=0.0436$.

4. $V_{0000}=0.080$, $V_{0001}=0.00070$, $V_{0100}=0$, $V_{0101}=0$, $V_{0010}=0.0026$. The value $\varphi_6=0.0480$.

5. $V_{00000}=0.030$, $V_{00001}=0.0080$, $V_{00010}=0.00070$, $V_{01000}=0$, $V_{01001}=0$, $V_{01010}=0$, $V_{00100}=0.00099$, $V_{00101}=0.00026$. The value $\varphi_7=0.0125$.

The final porosity of the compacted powder is found to be 0.90%, at relative volume fractions of, from largest to smallest particle group, 37.26%: 20.75%: 22.90%: 11.54%: 4.40%: 1.88%: 1.26%. Careful mixing of the powder in a static-free environment is necessary, before compaction, to achieve 0.90% porosity.

Tables:

CAPTION TABLE 1

Table of values for simulated mixtures of groups of bimodal, frictionless spheres, where each group consists of only one size of sphere. The ratio of group small to large average particle diameter and average particle volume are given, along with the critical number and volume fractions at which minimal porosity (maximum packing fraction) for the mixture is achieved. The simulations that determined these values were conducted using the TJ algorithm.[9] The method of simulation is critical to determining accurate values of minimal porosity and the critical relative volume fraction of small spheres at which that minimal porosity occurs.

| Small:Large Radius Ratio | Small:Large Volume Ratio | Small:Large Number Ratio | Relative volume fraction of small particles | Porosity | Packing Fraction |
|---|---|---|---|---|---|
| 0.001 | 1.0 × 10<sup>−9</sup> | 0.999999997 | 0.268 | 0.134 | 0.866 |
| 0.05 | 0.000125 | 0.99964 | 0.266 | 0.153 | 0.847 |
| 0.10 | 0.001 | 0.997 | 0.249 | 0.172 | 0.828 |
| 0.15 | 0.003375 | 0.988 | 0.217 | 0.191 | 0.809 |
| 0.20 | 0.008 | 0.970 | 0.206 | 0.216 | 0.784 |

CAPTION TABLE 1-continued

Table of values for simulated mixtures of groups of bimodal, frictionless spheres, where each group consists of only one size of sphere. The ratio of group small to large average particle diameter and average particle volume are given, along with the critical number and volume fractions at which minimal porosity (maximum packing fraction) for the mixture is achieved. The simulations that determined these values were conducted using the TJ algorithm.[9] The method of simulation is critical to determining accurate values of minimal porosity and the critical relative volume fraction of small spheres at which that minimal porosity occurs.

| Small:Large Radius Ratio | Small:Large Volume Ratio | Small:Large Number Ratio | Relative volume fraction of small particles | Porosity | Packing Fraction |
|---|---|---|---|---|---|
| 0.222 | 0.011 | 0.9625 | 0.219 | 0.230 | 0.770 |
| 0.33 | 0.036 | 0.90 | 0.244 | 0.283 | 0.717 |
| 0.45 | 0.091 | 0.80 | 0.267 | 0.318 | 0.682 |
| 0.95 | 0.857 | — | — | 0.365 | 0.635 |
| 1.00 | 1.0 | — | — | 0.366 | 0.634 |

CAPTION TABLE 2

Porosity
Table of porosity values at various small sphere relative volume fraction for simulated mixtures of groups of bimodal, frictionless spheres, where each group consists of only one size of sphere. The simulations that determined these values were conducted using the TJ algorithm.[9] The method of simulation is critical to determining accurate values of porosity at various small sphere relative volume fractions.

| Relative Volume Fraction of Small Spheres | Small:Large Diam. Ratio = 0.15 | Small:Large Diam. Ratio = 0.20 | Small:Large Diam. Ratio = 0.33 | Small:Large Diam. Ratio = 0.45 |
|---|---|---|---|---|
| 0.175 | 0.248 | 0.242 | 0.292 | 0.325 |
| 0.200 | 0.219 | 0.211 | 0.287 | 0.323 |
| 0.225 | 0.192 | 0.219 | 0.282 | 0.321 |
| 0.250 | 0.193 | 0.223 | 0.282 | 0.320 |
| 0.275 | 0.201 | 0.228 | 0.283 | 0.318 |
| 0.300 | 0.206 | 0.232 | 0.284 | 0.318 |
| 0.325 | 0.212 | 0.237 | 0.285 | 0.319 |
| 0.350 | 0.217 | 0.242 | 0.287 | 0.319 |
| 0.375 | 0.222 | 0.247 | 0.289 | 0.320 |
| 0.400 | 0.228 | 0.252 | 0.292 | 0.320 |
| 0.425 | 0.235 | 0.257 | 0.295 | 0.321 |
| 0.450 | 0.241 | 0.263 | 0.298 | 0.322 |
| 0.475 | 0.247 | 0.268 | 0.301 | 0.323 |
| 0.500 | 0.252 | 0.274 | 0.304 | 0.323 |

The invention claimed is:

1. A granular composite comprising a disordered, flowable, powder or suspension of at least two groups of particles of different average volumes, where for at least two of the groups of particles,
   i) the average volume of the larger of two groups adjacent by average volume is no more than 10,000 times the average volume of the other group,
   ii) the dividing volume between at least two adjacent groups is a smallest minimum point in a passing curve or similar size distribution representative of the composite, and where the value of the passing curve or similar size distribution at the smallest minimum point between the two groups is no greater than 75% of the value of the passing curve or similar size distribution at the largest maximum of either of the two groups,
   iii) on average,
      (a) the powder comprises particles from the larger of the two groups adjacent by average volume contact at least one other particle from the same group, or
      (b) the suspension comprises particles from the larger of the two groups adjacent by average volume have as nearest neighbors at least one other particle from the same group,
   iv) the two groups of particles adjacent by average volume do not spatially phase separate during a period of flow, and
   v) no region of space that is contained entirely within the granular composite and is of height, width, and depth that are all at least ten diameters of the largest particle of the larger of the two said groups is filled with only particles of either the smaller or larger groups, and further where in each region of such size, there are non-negligible quantities of three particle arrangements consisting of one particle from the smaller of the groups and two particles from the larger of the groups such that the smaller particle is; for a powder, both in contact with and separating the two particles from the larger of the groups; and for a suspension, both has the two larger particles as nearest neighbors but is separating them such that they are not in contact.

2. The granular composite of claim 1, where the average particle volume of the particle group of larger size is between 25 and 2000 times the average particle volume of the particle group of smaller size.

3. The granular composite of claim 2, wherein
(a) the powder comprises the composite can exhibit a porosity of less than 25%, where the porosity that the powder can exhibit is the minimum porosity of the disordered compacted powder whereby the granular composite remains flowable, that is, it has not been compacted by a method or with force sufficient such that particles are deformed or the powder has become a solid; or
(b) the suspension comprises the composite can exhibit a porosity of 25% or less, where the porosity that the suspension can exhibit is the minimum porosity of the suspension such that it will still flow.

4. The granular composite of claim 1, where the at least two groups are comprised of metal particles, or where one of the groups is comprised of metal and the other of ceramic particles.

5. The granular composite of claim 2, where the at least two groups are comprised of metal particles, or where one of the groups is comprised of metal and the other of ceramic particles.

6. The granular composite of claim 3, where the at least two groups are comprised of metal particles, or where one of the groups is comprised of metal and the other of ceramic particles.

7. The granular composite of claim 1, wherein the suspension comprises at least two groups of metal particles immersed in a solvent, liquid, gel or paste.

8. The granular composite of claim 2, wherein the suspension comprises at least two groups of metal particles immersed in a solvent, liquid, gel or paste.

9. The granular composite of claim 3, wherein the suspension comprises at least two groups of metal particles immersed in a solvent, liquid, gel or paste.

10. The granular composite of claim 1, where the composite comprises at least three groups of particles, each group representing at least 2% of the total relative volume of three of the groups.

11. The granular composite of claim 2, where the composite comprises at least three groups of particles, each group representing at least 2% of the total relative volume of three of the groups.

12. The granular composite of claim 3, where the composite comprises at least three groups of particles, each group representing at least 2% of the total relative volume of three of the groups.

* * * * *